US012775895B2

(12) United States Patent
Chokjaroenwathanakul et al.

(10) Patent No.: US 12,775,895 B2
(45) Date of Patent: Oct. 27, 2026

(54) AUTOMATED GENERATION OF WORKFLOW DOCUMENTATION

(71) Applicant: Palantir Technologies Inc., Denver, CO (US)

(72) Inventors: Shashamin Chokjaroenwathanakul, London (GB); Charles Perier, London (GB); Filip Balucha, London (GB); Tulika Mishra, London (GB); Adéla Víšková, London (GB); Stavros Filosidis, London (GB)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 19/084,578

(22) Filed: Mar. 19, 2025

(65) Prior Publication Data

US 2026/0120029 A1 Apr. 30, 2026

Related U.S. Application Data

(60) Provisional application No. 63/712,277, filed on Oct. 25, 2024.

(51) Int. Cl.

*G06Q 10/0633* (2023.01)
*G06F 9/451* (2018.01)
*G10L 15/26* (2006.01)

(52) U.S. Cl.

CPC ......... *G06Q 10/0633* (2013.01); *G06F 9/451* (2018.02); *G10L 15/26* (2013.01)

(58) Field of Classification Search

CPC ...... G06Q 10/06; G06Q 10/10; G06Q 10/063; G06Q 10/103

See application file for complete search history.

(56) References Cited

U.S. PATENT DOCUMENTS

2016/0085840 A1* 3/2016 Dixit .................. H04L 67/1097 707/602
2023/0360388 A1 11/2023 Singh (Continued)

FOREIGN PATENT DOCUMENTS

EP 3162079 12/2020
RU 2733919 10/2020

OTHER PUBLICATIONS

R. Wang et al., "Understanding the Quality of User Experience in Telepresence Systems From an Information Theory Perspective," in IEEE Transactions on Consumer Electronics, vol. 71, No. 2, pp. 6499-6510, May 2025 (Year: 2025).*

(Continued)

*Primary Examiner* — Maria C Santos-Diaz
(74) *Attorney, Agent, or Firm* — Knobbe, Martens, Olson & Bear, LLP

(57) ABSTRACT

An artificial intelligence system (AIS) can generate documentation documents describing a user's workflow through capturing meaningful and event-based workflow information to provide in an LLM prompt. The system may receive user inputs indicating start of a workflow capture session, monitor a user's use of a software application for selective, meaningful triggers, generate screen captures based on detected triggers and determine associated metadata. The system may record audio. The system may receive user inputs indicating stop of a workflow capture session, transcribe recorded audio to generate a transcript, and may associate text of the transcript with the generated screen captures based on determined metadata. The AIS can generate a prompt for the LLM based on at least some of the meaningful workflow information. The prompt can include at least some of the generated screen captures and associated (Continued)

metadata, some of the transcript, and instructions to generate a documentation document.

17 Claims, 10 Drawing Sheets

(56) References Cited

U.S. PATENT DOCUMENTS

| | | | |
|---|---|---|---|
| 2023/0385085 | A1 | 11/2023 | Singh |
| 2024/0086384 | A1 | 3/2024 | Soon-Shiong et al. |
| 2024/0119932 | A1 | 4/2024 | Khorshid et al. |
| 2024/0330578 | A1 | 10/2024 | Dotan-Cohen et al. |
| 2025/0013910 | A1 | 1/2025 | Grigore |
| 2025/0054327 | A1 | 2/2025 | Dines |

OTHER PUBLICATIONS

Trivedi , S. ., & Patel, N. (2021). Virtual Employee Monitoring: A Review on Tools, Opportunities, Challenges, and Decision Factors. Empirical Quests for Management Essences, 1(1), 86-99. 2021 (Year: 2021).*

Official Communication in European application No. EP 25169886.6, dated Oct. 10, 2025, in 6 pages.

* cited by examiner

300B

AUTOMATED GENERATION OF WORKFLOW DOCUMENTATION

CROSS-REFERENCE TO RELATED APPLICATIONS

This application claims benefit of U.S. Provisional Patent Application No. 63/712,277, filed Oct. 25, 2024, and titled "AUTOMATED GENERATION OF WORKFLOW DOCUMENTATION." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

FIELD

Implementations of the present disclosure relate to systems and techniques for improving user interactions with computer-based models. More specifically, implementations of the present disclosure relate to computerized systems and techniques that improve user interactions with large language models ("LLMs") through analysis, updating, supplementing, summarizing, and/or the like natural language prompts from users, as well as responses from the LLMs.

BACKGROUND

Large language models are opaque, imprecise, and inconsistent in their replies, which make them good conversationalists but also difficult to debug when they are expected to perform consistently. Further, complex calls to an LLM can involve multiple back-and-forth responses, where previous responses may be used in downstream prompts, which may further complicate the consistency and predictability of results.

SUMMARY

The systems, methods, and devices described herein each have several aspects, no single one of which is solely responsible for its desirable attributes. Without limiting the scope of this disclosure, several non-limiting features will now be described briefly.

Prompting a Large Language Model (LLM) to generate useful responses may be difficult with existing techniques and systems. Existing LLM systems may only be capable of receiving or outputting data as strings. Thus, prompt engineering with existing LLM systems often requires constructing lengthy natural language input which may be difficult and time-consuming, especially for complex prompts. Moreover, existing LLM systems often return undesirable responses due, in part, to the difficulties of constructing useful prompts. Additionally, existing LLM systems often generate responses in a format that may not be suitable for subsequent use such as in various data functions or operations.

An improved artificial intelligence system (or simply "system") achieves automated data monitoring and identification, gathering and collation of relevant data in combination with an LLM. In particular, the system facilitates generating LLM prompts that can increase the usefulness (e.g., accuracy, relevance, effectiveness, and/or the like) of LLM responses. In particular, the system discussed herein generates an LLM prompt (or prompts) that provide instructions to an LLM to respond with some or all of a workflow's documentation. For example, an LLM response can include a documentation document that accurately, completely, and clearly describes, in detail, a user's workflow.

In some embodiments, at the request of a user, an Artificial Intelligence System ("AIS" or "system"), components thereof, or devices and/or modules (e.g., an event listener) in communication with the AIS can monitor interactions of the user with a software application, such as in performing a particular workflow. In response to the user request to initiate monitoring, the system can generate an alert or notification for output to the user that indicates that monitoring has begun or is ongoing. The notification may be provided to any other entity that is involved in the workflow, such as another user that shares content with the user, such as in a video call that occurs as part of the monitoring or screen sharing. The system can capture selective and meaningful portions of the workflow of the user, such as in using the software application, for generation of an LLM prompt. Workflow information can include screen captures, audio transcripts, application metadata, and/or other context information that may be associated with an important aspect of the workflow of the user. For example, the system may generate screen captures and associated metadata based on identified and detected meaningful user interactions with the software application and/or actions performed by the software application. In some examples, the system may associate portions of an audio transcript with meaningful user interactions with the software application and/or actions performed by the software application.

The system can generate meaningful prompts (e.g., prompts that can induce useful LLM responses) based on at least some of the workflow information. For example, the system may transform at least some of the screen captures, associated metadata, audio transcript, and/or other context information into a meaningful prompt that is provided to the LLM such that the LLM can generate a useful response. In some embodiments, the system may augment user input with at least some of the workflow information, which can reduce the burden of prompt engineering on the user and increase the effectiveness of the prompt in inducing the LLM to generate a useful response such as accurate, complete, clear, and/or detailed workflow documentation.

The workflow information may be provided to an LLM with instructions to generate workflow documentation (e.g., accurate, complete, clear, and/or detailed workflow documentation). Instructions may define the purpose, behavior (e.g., formatting), and/or constraints of the LLM. Instructions may be detailed or high-level. In some embodiments, the instructions may be an initial prompt provided via user input. In some embodiments, the system itself may generate an initial prompt that instructs the LLM. For example, the system may generate and provide to the LLM an initial prompt such as "you are a documentation generator." The LLM may then generate documentation, e.g., explaining how the particular workflow is performed in the software application, based on the workflow information, e.g., screen captures, audio transcripts, application metadata, and/or other context information that is included in the LLM prompt.

Various combinations of the above and below recited features, embodiments, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise one or more computer-readable storage mediums or devices comprising, configured to store, and/or storing program instructions, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising one or more computer-readable storage mediums or devices, and/or one or more computer-readable storage mediums or devices, are disclosed, wherein the computer-readable storage mediums comprise, are configured to store, and/or store program instructions, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings.

DETAILED DESCRIPTION

Figure 1:
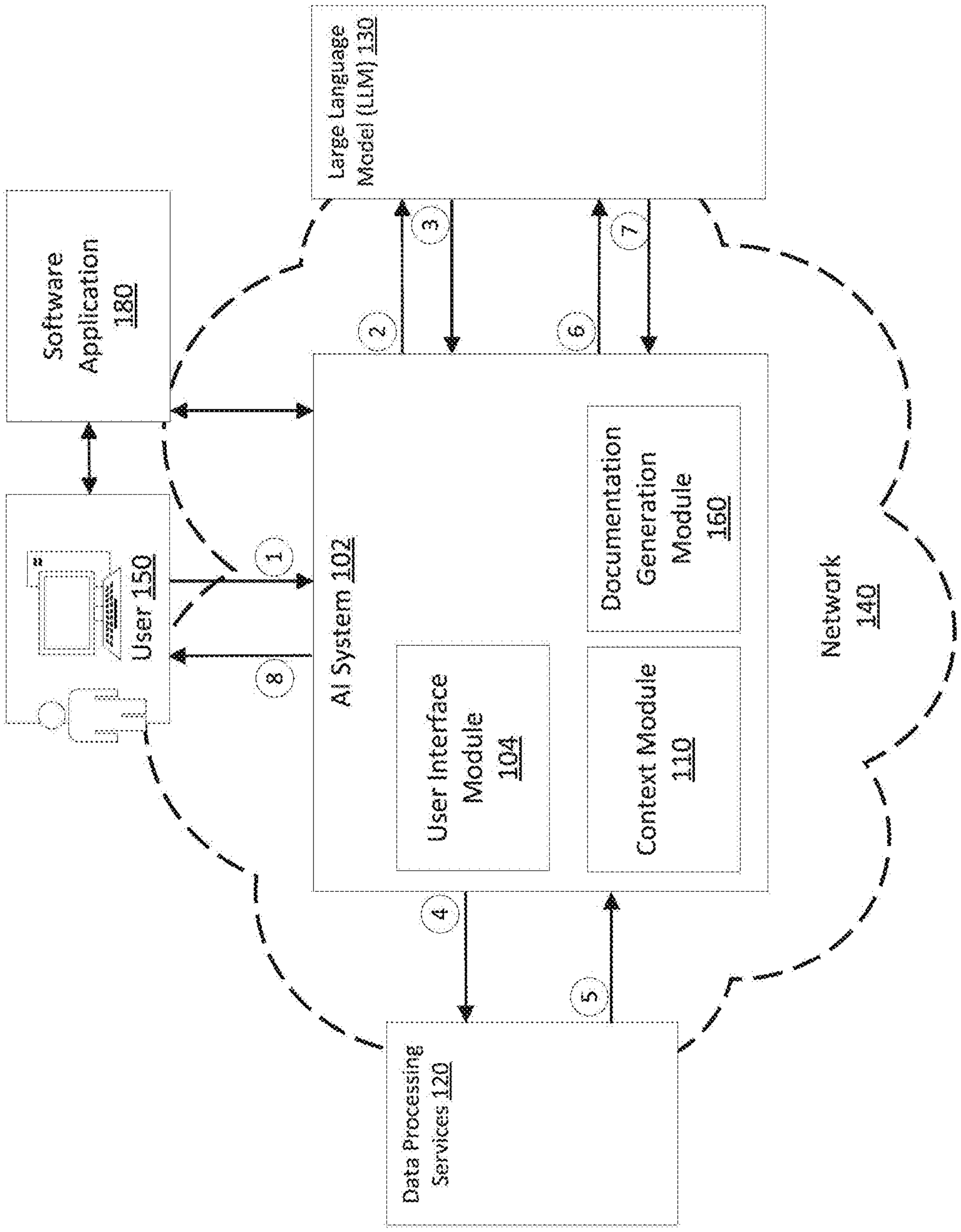
FIG. 1 is a block diagram illustrating an example Artificial Intelligence System (or "AIS") in communication with various devices.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

Many establishments implement various methods of capturing a user's workflow, such as the workflow of an employee or other user, for potential dissemination to other users such as employees, officers, and/or the like, of an establishment, and/or end-users of a product such as customers. In this context, "workflow" generally refers to a user's performance of a task, such as a user's performance of one or more steps involved in completing the task. Many establishments may implement various methods of capturing a user's workflow for further analysis of the workflow. Capturing workflow for further analysis can permit an establishment, such as a business, to streamline processes to improve overall productivity. Capturing workflow can enable an establishment to create a record of how a task is performed, which may improve knowledge sharing such as when onboarding new employees by helping ensure that institutional knowledge is preserved and easily transferrable. Capturing workflow can help in the creation of training materials and/or tutorials, which may permit new users (e.g., employees, customers, and/or the like) to follow clear, detailed instructions for what otherwise may be a very complex user environment (e.g., a complex software environment).

Automating the workflow capture process can advantageously increase the speed, frequency, and accuracy at which workflow is documented. However, such workflow capture techniques may result in storage of large volumes of data as such techniques often record all or too much of a user's workflow in detail (e.g., indiscriminate recording). This can lead to excessive use of data storage and/or increase processing demands when later filtering or summarizing data, making it difficult to capture and document long workflows (e.g., workflows of long duration) without consuming significant computational resources. For example, conventional techniques involving screen recordings and/or data logs can produce large video/image files and/or data files over time that are both processor and memory intensive. For example, a video file of a user performing a workflow over a period of fifteen to sixty minutes or more may be analyzed to extract information and generate documentation. In some examples, conventional techniques may involve parsing through the stored data to find relevant data, as not all data may be processed into actionable data by a system due to computational resource limits (e.g., processor performance and/or memory limits). Such processing of high volumes of data (e.g., large video files or voluminous screen captures, such as every x seconds) can reduce a system's speed in generating summaries, reports, and/or the like, that convert the captured workflow into another format (e.g., a PDF) that is capable of being disseminated to and quickly understood by a user. As workflows become more complex, conventional techniques may scale poorly as systems struggle to efficiently handle increased volumes of data. Moreover, many systems may lack an ability to understand the context behind a user's actions in performing a task, which can lead to incomplete or misleading captures of workflows. Furthermore, automated workflow capture can raise privacy and/or security concerns (especially in sensitive environments such as healthcare, finance, the legal field, and/or the like) where content that is not meant to be captured may indeed be captured by the system, which can discourage use of such systems altogether.

An improved artificial intelligence system ("AIS" or simply "system") facilitates automated generation of workflow documentation using an LLM. In response to a user initiating monitoring of a software application during performance of a workflow and the system providing workflow information obtained while monitoring the software application during performance of a workflow, an LLM can provide a response including some or all of a workflow's documentation. A workflow can include a user's use of a software application, such as in performing a task. The system, based on user input indicating initiation of monitoring, may monitor a user's use of the software application (e.g., user interactions with the software application and/or actions performed by the software application) and capture workflow information, such as workflow information that may be associated with an important aspect of the workflow. In this context, "workflow information" generally refers to data and/or context associated with interactions of a user with a software application and/or actions performed by the software application (e.g., workflow data and/or context). The system can capture selective and meaningful portions of the user's workflow, such as in response to detection of event triggers as the user performs the workflow in the software application. For example, the system can proctor/filter event capture during monitoring as the user can select which types of events (e.g., event triggers) and/or metadata is to be captured by the system. This can help ensure that only relevant events and/or metadata (e.g., associated with important aspects of the workflow of a user) are captured by the system. Advantageously, this can reduce the volume of data that is analyzed and stored by the system without reducing (or while minimizing reduction of) the effectiveness of generated prompts in inducing useful LLM responses. Moreover, selection of certain event types and/or metadata for capture by the system can help ensure that private, sensitive, and/or confidential information is excluded from collection by the system during monitoring.

Systems and methods described herein automatically generate a prompt to induce an LLM to generate a workflow documentation, such as in one or more documents or other file types, that describes a user's workflow, based on selective and meaningful event-based recording/monitoring of the user's workflow. For example, an artificial intelligence system, based on user input indicating initiation of monitoring, may be configured to start and end a workflow capture session of a user's use of a software application. In this context, "workflow capture session" generally refers to a system's monitoring and recording of data associated with a user's use of a software application in performing a task. During a workflow capture session, the artificial intelligence system may be configured to identify and detect user interactions with the software application or actions performed by the software application that may be associated with an important aspect of the workflow. These user interactions with the software application or actions performed by the software application may be referred to as "event triggers," which may cause the system to obtain a screen capture and other metadata associated with the software application when detected. These screen captures of the software application user interface and associated metadata may then be included in an LLM prompt.

During, or after, a workflow capture session, the artificial intelligence system may be configured to record and transcribe audio from the user describing the workflow, and determine associated metadata, to potentially include in an LLM prompt. The artificial intelligence system may be configured to, for each screen capture to be included in an LLM prompt, associate text of a generated transcript with the screen capture based on, for example, metadata such as timestamps. As further described herein, the artificial intelligence system may be configured to generate an LLM prompt based on at least some of this workflow information to induce an LLM to generate workflow documentation describing the user's workflow. In some embodiments, as further described herein, the artificial intelligence system may be configured to generate one or more intermediate documentation documents (e.g., intermediate workflow documentation) for further processing by an LLM to generate a final documentation document (e.g., final workflow documentation).

The system can augment workflow information, which can increase the effectiveness of the prompt in inducing the LLM to generate workflow documentation (e.g., accurate, complete, clear, and/or detailed documentation document). Augmentation of workflow information can be based on the user's input and/or the user's interactions with the artificial intelligence system. For example, the user may modify generated screen captures, such as by annotating and/or blurring a portion of a screen capture. In some examples, the user may modify a generated transcript, such as by editing the transcript to add, remove, and/or change text of the transcript.

Advantageously, the systems and methods disclosed herein may increase computational resource efficiency of automated workflow capture by, for example, reducing (or minimizing) processing demands and/or memory storage demands. For example, identifying and detecting event triggers and generating screen captures based on the detected, identified events may reduce processing and/or memory storage demands on the LLM without reducing (or mitigating reduction of) the quality of the selected workflow information and/or the effectiveness of the prompt in inducing an LLM to generate workflow documentation (e.g., accurate, complete, clear, and/or detailed workflow documentation). By identifying and detecting triggers and generating screen captures based on said triggers, systems and methods described herein can reduce (or minimize) the total quantity of workflow information that is processed by an LLM; thus, fewer computational cycles may be required during inference. Moreover, the artificial intelligence system may, automatically and/or in response to user input, crop the generated screen captures, such as based on the location of the detected event within the software application GUI, thereby capturing meaningful display content while reducing (or minimizing) image file sizes. Providing an LLM with event-based and cropped screen captures, along with computationally light metadata, may utilize less processing by the LLM than does calling an LLM to process indiscriminate screen captures/recordings (e.g., a video recording of the entire workflow session). This can reduce overall processing demands.

Additionally, associating text of the generated transcript with each of the screen captures based on lightweight metadata (e.g., timestamps) may further increase the effectiveness of an LLM prompt without increasing (or mitigating increase of) processing and/or storage demands. Text from the generated transcript may provide the LLM with additional context for the generated screen captures.

Furthermore, because each generated screen capture is associated with a selective and meaningful workflow event, this can help maximize useful workflow information within a limited context window, which can reduce (or minimize) excessive user input. This may be particularly advantageous when dealing with long prompts or complex tasks that can require detailed user input, where an LLM may otherwise truncate inputs (e.g., due to token limits) and reprocess them, thereby wasting computational resources and increasing expense. Systems and methods herein can be scaled to handle more requests with fewer computational resources. In environments where an LLM serves many users simultaneously (e.g., cloud services), generating computationally light screen captures based on selective and meaningful workflow events, and determining lightweight metadata associated with the screen captures, can permit the LLM to handle more requests in parallel without (or mitigating a need for) scaling up hardware resources. This can improve computational resource efficiency in large-scale deployments.

Advantageously, the systems and methods disclosed herein may reduce (or minimize) memory storage demands. Systems and methods disclosed herein may do so without reducing (or mitigating reduction of) the quality of selected workflow information and/or without reducing (or mitigating reduction of) the effectiveness of generated prompts in inducing LLM responses (e.g., accurate, complete, clear, and detailed documentation documents). For example, generating computationally light screen captures based on selective and meaningful workflow events can reduce (or minimize) a need to maintain large datasets in memory. Because the system may load and process a computationally manageable quantity of workflow information, LLM prompts may require less memory for temporary storage during processing, reducing the memory footprint during inference.

Additionally, because systems and methods herein can increase computational resource efficiency, the system may consume less energy overall, which can be important in large-scale AI deployments where energy costs may be substantial. Advantageously, by generating computationally light and event-based screen captures based on identified and detected triggers, it can be possible to utilize smaller LLMs or optimized LLM variants, which consume less memory and require less processing power than do larger LLMs.

Advantageously, the systems and methods disclosed herein may reduce overall computation times for generating LLM responses. For example, generating computationally light and event-based screen captures based on identified and detected triggers, and determining lightweight metadata to associate screen captures with generated text, can be less processor intensive, and thus quicker, than processing indiscriminate volumes of workflow information by an LLM. Systems and methods disclosed herein may do so without reducing (or mitigating reduction of) the quality of selected workflow information and/or without reducing (or mitigating reduction of) the effectiveness of a prompt in inducing LLM responses. For example, systems and methods herein may reduce the overall time that an LLM spends processing user queries, which may increase LLM response times and reduce overall latency in real-time applications, which can be critical in interactive AI systems.

In some embodiments, as further described herein, the artificial intelligence system may be configured to blur private, sensitive, and/or confidential information that may otherwise appear in a generated screen capture. This can permit the automated workflow capture to comply with various data privacy and security requirements.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The term “model,” as used in the present disclosure, can include any computer-based models of any type and of any level of complexity, such as any type of sequential, functional, or concurrent model. Models can further include various types of computational models, such as, for example, artificial neural networks (“NN”), language models (e.g., large language models (“LLMs”)), artificial intelligence (“AI”) models, machine learning (“ML”) models, multimodal models (e.g., models or combinations of models that can accept inputs of multiple modalities, such as images and text), and/or the like.

A “language model” is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, and/or the like). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model (“LLM”) is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. LLMs may work by taking an input text and repeatedly predicting the next word or token (e.g., a portion of a word, a combination of one or more words or portions of words, punctuation, and/or any combination of the foregoing and/or the like). An LLM may be of any type, including a Question Answer (“QA”) LLM that may be optimized for generating answers from a context, a multimodal LLM/model, and/or the like. An LLM (and/or other models of the present disclosure) may include, for example, a NN trained using self-supervised learning and/or semi-supervised learning, a feedforward NN, a recurrent NN, and/or the like. An LLM (and/or other models of the present disclosure) may further include, for example, attention-based and/or transformer architecture or functionality. LLMs can be extremely useful for natural language processing, including receiving natural language prompts and providing natural language responses based on the text on which the model is trained. LLMs may not be data security- or data permissions-aware, because they generally do not retain permissions information associated with the text upon which they are trained. Thus, responses provided by LLMs are typically not limited to any particular permissions-based portion of the model.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, language model, or LLM, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLaMA (Large Language Model Meta AI), and BigScience Large Open-science Open-access Multilingual Language Model (BLOOM).

Data Processing Service (or "Service" or "Plug-in"): receives and responds to requests for data and/or data processing. A Plug-in may be accessible via an API that is exposed to an Artificial Intelligence System (and/or other remote systems) and allows data processing requests to be received via API calls from those systems (e.g., an AIS). A few examples of services or plug-ins include a table search service, a filter service, an object search service, a text search service, or any other appropriate search service, indexing services, services for formatting text or visual graphics, services for generating, creating, embedding and/or managing interactive objects in a graphical user interface, services for caching data, services for writing to databases, an ontology traversing service (e.g., for traversing an ontology or performing search-arounds in the ontology to surface linked objects or other data items) or any other data retrieval, processing, and/or analysis function.

Prompt (or "LLM Prompt" or "Natural Language Prompt" or "Model Input"): a term, phrase, question, and/or statement written in a human language (e.g., English, Chinese, Spanish, and/or the like) that serves as a starting point for a language model and/or other language processing. A prompt may include only a user input or may be generated based on a user input, such as by a prompt generation module (e.g., of an artificial intelligence system) that supplements a user input with instructions, examples, and/or information that may improve the effectiveness (e.g., accuracy and/or relevance) of an output from the language model. A prompt may be provided to an LLM, which the LLM can use to generate a response (or "model output"). Depending on the LLM, a prompt may be multi-modal, e.g., including data in non-text formats, such as images, audio, video, and/or the like User Input (or "Natural Language Input"): a term, phrase, question, and/or statement written in a human language (e.g., English, Chinese, Spanish, and/or the like) that is provided by a user, such as via a keyboard, mouse, touchscreen, voice recognition, and/or other input device. User input can include a task to be performed, such as by an LLM, in whole or in part. User input can include a request for data, such as data accessed and/or processed by one or more services. User input can indicate one or more tools associated with the user request or task which may facilitate performing the task. User input can indicate one or more data object types associated with a tool. User input can indicate one or more actions associated with a tool. User input can include a user selection of a format for a response from an LLM. User input can include a user-defined variable to which a response may be saved.

Context: any information associated with user inputs, prompts, responses, and/or the like that are generated and/or communicated to/from the user, the artificial intelligence system, the LLM, the data processing services, and/or any other device or system. For example, context may include a conversation history of all of the user inputs, prompts, and responses of a user session. Context may be provided to an LLM to help an LLM understand the meaning of and/or to process a prompt, such as a specific piece of text within a prompt. Context can include information associated with a user, user session, or some other characteristic, which may be stored and/or managed by a context module. Context may include all or part of a conversation history from one or more sessions with the user (e.g., a sequence of user prompts and/or LLM prompts and orchestrator selector responses or results, and/or user selections (e.g., via a point and click interface or other graphical user interface). Thus, context may include one or more of: previous analyses performed by the user and/or LLM, previous prompts provided by the user and/or an artificial intelligence system, previous conversation of the user with the language model, schema of data being analyzed, a role of the user, a context of the data processing system (e.g., the field), and/or other contextual information.

A context module may provide all or only a relevant portion of context to a selection module for use in selecting one or more plug-ins and/or service orchestrators (e.g., configured to generate requests to plug-ins) for use in generating a properly formatted service request. Context can include tool information. Context can include tool implementation examples. In some embodiments, context may include identification of services and parameters of prior operations, but not underlying data that was accessed or retrieved by the service (e.g., use of graph visualization service and graph parameters without indicating the data illustrated in the graph). In some embodiments, context may include some or all of the underlying data accessed or retrieved by the service.

A Tool can include a set of logic or rules that can be provided to an LLM that the LLM can use to obtain additional information, such as by generating a request for access to additional data via a plug-in. Thus, a tool can be used by an LLM to generate requests (that may be fulfilled by the AIS) to perform operations such as querying datasets, processing data including filtering or aggregating data, writing to datasets (e.g., adding or updating rows of a table, editing or updating an object type, updating parameter values for an object instance, generating a new object instance), implementing integrated applications (e.g., an email or SMS application), communicating with external application programming interfaces (APIs), and/or any other functions that communicate with other external or internal components. Example tools include ontology function tool, date/time tool, query objects tool, calculator tool, and apply action tool. Tools, or the set of logic they comprise for performing one or more operations, may be defined by a system, external database, ontology, and/or a user.

Tool Information can include information associated with a tool that is provided to an LLM and is usable to implement the tool functionality. Tool information can indicate how data is structured, such as in an ontology. Tool information can indicate properties associated with a particular data object type, such as a data object type associated with a selected tool. Tool information can include instructions for implementing a tool. Tool information can include instructions for generating a tool call to use the tool, including instructions for formatting a tool call. In some implementations, tool information can comprise tool implementation examples for executing one or more tool operations which can include pre-defined examples, user-selected examples, user-generated examples, and/or examples that are automatically dynamically configured based on context.

Ontology: stored information that provides a data model for storage of data in one or more databases and/or other data stores. For example, the stored data may include definitions for data object types and respective associated property types. An ontology may also include respective link types/definitions associated with data object types, which may include indications of how data object types may be related to one another. An ontology may also include respective actions associated with data object types or data object instances. The actions may include defined changes to values of properties based on various inputs. An ontology may also include respective functions, or indications of associated functions, associated with data object types, which functions may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

Data Object (or "Object"): a data container for information representing a specific thing in the world that has a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (also referred to as "contents") may be represented in one or more properties. Attributes may include, for example, metadata about an object, such as a geographic location associated with the item, a value associated with the item, a probability associated with the item, an event associated with the item, and so forth.

An Object Type is a type of a data object (e.g., person, event, document, and/or the like). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

Example System

FIG. 1 is a block diagram illustrating an example Artificial Intelligence System (or "AIS") 102 in communication with various devices to, among other things, generate LLM prompts and interact with an LLM 130. In the example of FIG. 1, the Artificial Intelligence System 102 comprises various modules, including a User Interface Module 104, a Documentation Generation Module 160, and a Context Module 110. In other embodiments, the AIS 102 may include fewer or additional components. In some implementations, the Artificial Intelligence System 102 may comprise the user device 150. In some implementations, the AIS 102 may comprise Software Application 180.

In the example of FIG. 1, the various devices are in communication via a network 140, which may include any combination of networks, such as one or more local area network (LAN), personal area network (PAN), wide area network (WAN), the Internet, and/or any other communication network. In some embodiments, modules of the illustrated components, such as User Interface Module 104, Documentation Generation Module 160, and Context Module 110 of the Artificial Intelligence System 102, may communicate via an internal bus and/or via the network 140.

A user interface module 104 is configured to generate interactive user interface data that may be rendered on a user device 150, such as to receive an initial user input, as well as later user input that may be used to initiate further data processing. In some embodiments, the functionality discussed with reference to the user interface module 104, and/or any other user interface functionality discussed herein, may be performed by a device or service outside of the Artificial Intelligence System 102 and/or the user interface module 104 may be outside the Artificial Intelligence System 102. For example, the user interface module 104 may be comprised, in whole or in part, on the user device 150.

A context module 110 is configured to maintain, select, and/or provide some or all relevant context associated with a software application, user input, user session, multiple sessions of the user, and/or other context. The context module 110 may store context for various groups of users, e.g., user inputs from multiple users. The Artificial Intelligence System 102, LLM, and/or other components of the system may make use of context in fulfilling their functions. Context may include, for example, all or part of a conversation history from one or more sessions with the user (e.g., a sequence of user inputs and responses or results), user selections (e.g., via a point and click interface or other graphical user interface), data processing services 120 implemented during the session, user-selected objects and any corresponding properties for those objects, any linked objects as defined by a relevant ontology, and the like. As one example, if a most recent result returned to a user included a filtered set of "flight" objects, and a user types "send an email listing the flights to my manager," the AIS 102 may make use of the context of the filtered set of aircraft objects, as provided by the context module, and include a list of those objects in an email.

In some embodiments, the user interface module 104 may suggest certain actions to the user (e.g., any actions described herein, or any other related actions) based on context provided by context module 110 (e.g., email the account manager of the account that is being displayed).

A documentation generation module 160 is configured to generate a prompt to a language model, such as LLM 130. As described in further detail below, the documentation generation module 160 may generate a prompt based on data provided by the user interface module 104 (e.g., a user input, tool information, and/or the like), the context module 110 (e.g., conversation history and/or other contextual information), and/or a software application such as app 180 (e.g., user workflow and corresponding workflow information). In some embodiments, as further described herein, the documentation generation module 160 can be configured to capture data associated with the workflow of a user as he or she uses app 180 (e.g., a browser-based application or standalone application), and which the documentation generation module 160 may potentially add to an LLM prompt. As further described herein, workflow information (e.g., workflow data and/or context) may include workflow events associated with use of app 180, screen captures of app 180, metadata, transcribed audio that provides a description of at least one or more steps of the workflow process, and/or instructions intended for an LLM. After the user finishes a workflow using app 180, the documentation generation module 160 may select and add relevant workflow data and/or context to an LLM prompt.

The documentation generation module 160 may automatically generate an LLM prompt that includes instructions intended for an LLM (e.g., LLM 130). The documentation generation module 160 may generate the instructions based on workflow information collected during a workflow capture session. For example, the documentation generation module 160 may automatically generate instructions based on workflow information selected (e.g., screen captures selected by user input) to be provided to an LLM for generation of workflow documentation. The instructions may be intended to instruct the LLM to generate workflow documentation that describes the user's use of the software application, such as in performing a particular workflow. The instructions can indicate a level of detail with which the LLM should generate workflow documentation, such as the level of detail with which to describe the steps of the user in using software application 180 to perform the particular workflow. The instructions can indicate a format that the LLM should follow in generating workflow documentation, such as the visual organization of the information in the documentation document.

The documentation generation module 160 may add various workflow data and/or context to the instructions to generate the LLM prompt. For example, an LLM prompt may include, in addition to screen captures, transcripts, and/or application metadata, instructions such as "write a step-by-step description of the workflow and how to reproduce it." In some embodiments, the documentation generation module 160 may receive user input, from the user interface module 104, indicative of instructions intended for an LLM and instructing the LLM to generate workflow documentation. For example, the user may customize the instructions generated by the documentation generation module 160, such as based on particular requirements for documentation.

In some embodiments, the documentation generation module 160 may be implemented as any available type of service, including but not limited to, browser extensions, widgets, add-ons, applets, plug-ins, and the like, such as may execute on the user device 150 while the user interacts with a software application to perform a workflow. The documentation generation module 160 may be fully integrable into the AIS 102. For example, the documentation generation module 160 may be implemented as an applet that runs in a sandbox environment, and which is embedded into and executed by the AIS 102 (e.g., executed within the greater AIS 102 environment). In some examples, the documentation generation module 160 may be implemented as a plug-in that is integrated directly into the AIS 102 and adds and/or modifies one or more functionalities of the AIS 102 and/or components thereof.

In the example of FIG. 1, a user 150 (which generally refers to human user and/or a computing device of any type that may be operated by a human user) provides user input that causes the documentation generation module 160 to begin or end capture of a workflow session (e.g., capture of data and/or context associated with the interactions of the user with software application 180 and/or actions performed by software application 180). In some examples, the user 150 may provide user input indicative of instructions intended for an LLM to generate workflow documentation that describes the workflow of the user, such as in using software application 180. In some embodiments, the user 150 may provide user input to modify instructions generated by the documentation generation module 160 for the LLM to generate workflow documentation that describes the workflow of the user, such as in using software application 180. The instructions may be intended to instruct the LLM to generate workflow documentation that provides a step-by-step guide of the user's use of app 180, such as in performing the particular workflow. In some embodiments, the user 150 may speak while in a workflow session, which may be recorded by the documentation generation module 160. The documentation generation module 160 may receive audio input, such as audio signals indicative of words spoken by the user. In some embodiments, the user 150 may provide user input that causes the documentation generation module 160 to select and/or modify one or more of the workflow information (e.g., the workflow data and/or context) to be added to an LLM prompt.

In some embodiments, the user device 150 and/or AIS 102 (or any component of AIS 102) can be in communication with Software Application 180. For example, the AIS 102 (and/or components thereof) may access data originating from app 180, such as via an API call. App 180 may be used with any computing device, such as user device 150. In some embodiments, app 180 may be a web-based application accessed via the Internet, such as via a browser on the user device 150. In some embodiments, app 180 may include a cloud-based application in communication with a browser executing on the user device 150 and/or AIS 102. In some embodiments, app 180 may be fully integrable into and executed by the AIS 102 (e.g., executed within the AIS 102 environment). In some embodiments, app 180 may be outside of the AIS 102. For example, the app 180 may be comprised entirely on the user device 150.

The Artificial Intelligence System 102 may include and/or have access to the LLM 130 and/or other language model, and the LLM may be fine-tuned or trained on appropriate training data (e.g., annotated data showing correct or incorrect pairings of sample natural language queries and responses). The Artificial Intelligence System 102 may generate and provide a prompt to the LLM 130, which may include one or more large language models trained to fulfill a modeling objective, such as task completion, text generation, summarization, and/or the like In some implementations, the AIS 102 may be capable of interfacing with multiple LLMs. This allows for experimentation and adaptation to different models based on specific use cases or requirements, providing versatility and scalability to the system. In some implementations, the AIS 102 may interface with a second LLM in order to, for example, generate an input to a data processing service 120, or to generate some or all of a natural language prompt (e.g., generate a prompt for the LLM 130).

The Artificial Intelligence System 102 may also communicate with one or more Data Processing Services 120 in the course of fulfilling a user input and/or a task. The data processing services 120 may include any quantity of services (or "plug-ins") and any available type of service. For example, the services 120 may include one or more search services (e.g., a table search service, an object search service, a text search service, or any other appropriate search service), indexing services, services for formatting text or visual graphics, services for generating, creating, embedding and/or managing interactive objects in a graphical user interface, services for caching data, services for writing to databases, an ontology traversing service (e.g., for traversing an ontology or performing search-arounds in the ontology to surface linked objects or other data items) or any other services. In some implementations, tool information provided in a prompt to the LLM enables the LLM to return a properly formatted request for further information from a plug-in, such as in the form of an API call to a data processing service. Thus, the LLM 130 may indirectly request (via the AIS 102) for data processing services 120 to perform a specific process. The output from the data processing service 120 may then be provided back to the LLM 130 for further processing of a task and/or to develop a final result to be provided to the user. In some implementations, the data processing services 120 may be a part of the AIS 102 (e.g., as part of a data processing services module of AIS 102). In some implementations, the data processing services 120 may be external to the AIS 102.

FIG. 1 includes a set of circles numbered from 1-8 that illustrate an example set of interactions and data that may be exchanged between various devices, such as the user 150, AIS 102, LLM 130, and services 120. In other implementations, the interactions and/or data may be ordered differently. Beginning with interaction 1, the AIS 102 receives a user input from the user device 150. As noted above, the user input can include starting or stopping a workflow capture session, modification of workflow information (e.g., editing and/or updating workflow information intended for an LLM), modification of instructions instructing the LLM to generate workflow documentation, and/or other information.

Next, at interaction 2 the documentation generation module 160 generates a prompt based on at least the user input. The prompt can include the user input and/or may be generated based on other context, such as may be accessed by the context module 110 and/or that originating with app 180. In some embodiments, as further described herein, responsive to user input indicating initiation of monitoring, the documentation generation module 160 may capture workflow information (e.g., workflow data and/or context) associated with a user's workflow, such as based on selective and meaningful event-based monitoring of the workflow of the user, such as in using software application 180. The AIS may capture workflow information associated with detected event triggers (e.g., particular user interactions with software application 180). The documentation generation module 160 may capture workflow data and/or context to potentially add to an LLM prompt. The documentation generation module 160 may add at least some of the workflow information to the LLM prompt. For example, the documentation generation module 160 may add relevant workflow data and/or context to the LLM prompt. In some embodiments, the prompt can include instructions intended for an LLM, such as instructions intended to instruct the LLM to generate workflow documentation that describes the workflow of the user, such as in using app 180.

The prompt can include a natural language prompt. For example, the prompt can include instructions for instructing the LLM to generate workflow documentation that describes some or all of the workflow of the user, such as in using software application 180. The prompt can include various different workflow information, such a screen captures, event metadata, transcribed audio, intermediate documentation documents, and/or the like. For example, workflow data can include workflow events, such as events that trigger a screen capture of the app 180 by the documentation generation module 160. Event triggers can be associated with an important aspect of the workflow of the user and associated with relevant metadata.

Event triggers can include native workflow events, including but not limited to, mouse events, keyboard events, touch events, clipboard events, drag and drop events, window and document events, and/or the like. Native events are events that the software application 180 and/or a browser can natively identify. For example, native events can originate with software application 180, such as an event generated directly by an operating system or browser. Native events, when detected by the software application, browser, and/or the AIS 102 (e.g., the documentation generation module 160), can trigger corresponding actions or event listeners. Native events can be natively supported by the software application and can be automatically captured by the document object model ("DOM") of the software application to trigger corresponding actions or event listeners. Mouse events may include clicking, hovering, scrolling, and/or other mouse-related events. Keyboard events may include keypresses and/or other keyboard-related events. Touch events can include finger presses and/or other tactile interactions with a touchscreen device. Clipboard events can include cutting, copying, and/or pasting of content. Drag and drop events may include when an element/content is dragged and/or dropped within a document. Window and document events may include events associated with changes to a window (e.g., changes to a web browser, changes to a user interface, and/or the like) and/or a document state such as when a page or element loads or unloads, when a window is resized, when a document is scrolled, and/or the like.

In some embodiments, event triggers can include custom events, such as events defined by a user (that are not detectable as native events). Custom events may be defined by a developer (e.g., a developer of a software application that is being monitored by the AIS 102) or a provider (e.g., a provider of the AIS 102, such as a provider of a workflow session capture plug-in). Custom events may be programmed into logic of an operating system and/or software application via a framework, library, script, and/or the like. In some embodiments, the AIS 102 can suggest one or more custom events, such as based on previous workflow capture sessions, the type of workflow being performed, and/or the type of software application being used. Custom events can include other events, such as non-native events. In some embodiments, custom events can simulate native events. Custom events, when detected by the software application, browser, and/or the AIS 102 (e.g., the documentation generation module 160), can trigger corresponding actions or event listeners. Custom events may be captured by the DOM of the software application to trigger corresponding actions or event listeners.

In some embodiments, event triggers can include identified events such that the documentation generation module 160 can filter out and/or ignore trivial and/or redundant actions and/or occurrences. For example, the documentation generation module 160 may "detect" only a particular set of events. As further described herein, the documentation generation module 160 may be configured to filter out or ignore certain triggers based on detected patterns and/or sequences of user interactions (e.g., clicking a button multiple times in rapid succession), thresholds, and/or filters. Advantageously, this can reduce the quantity of workflow data (e.g., screen captures) stored by the system without reducing (or mitigating reduction of) the quality of the captured workflow data.

In some embodiments, workflow data can include screen captures of the software application 180 taken by the documentation generation module 160. As further described herein, screen captures may be taken by the documentation generation module 160 in response to detection of an event trigger.

Workflow data can include metadata associated with the software application at the time of an event trigger. Metadata can include descriptive metadata, and/or structural metadata. For example, metadata can include document file information, event information, document properties, versioning metadata, security and permissions, software application data, formatting data, geolocation data, embedding objects and/or links, and/or the like. Event information can include event types (e.g., click, keypress, and/or the like), timestamps, text content of a target element, position of a target element, target key, event source (e.g., user interaction or action performed by the software application), event position (e.g., location of a cursor on a display), scroll position, event duration (e.g., time spent hovering in a location), event count (e.g., number of clicks), and/or the like.

Workflow context can include any information associated with the user's workflow in using the software application 180. This may include any user inputs, prompts, responses, and/or the like, that are generated and/or communicated to/from the user, the AIS 102, the LLM 130, the data processing services 120, and/or any other device or system. For example, workflow context may include instructions intended for an LLM. The instructions may be intended to instruct the LLM to generate workflow documentation that describes the user's use of app 180. For example, the instructions may be intended to guide the LLM to generate workflow documentation that provides a step-by-step guide of the user's use of app 180. In some embodiments, workflow context can include a transcript generated in response to detected audio signals indicative of words spoken by the user. The transcript can include description of the document being created by the user, such as description of one or more steps involved in creating the document.

In some embodiments, workflow context can include intermediate documentation documents generated by the LLM and provided to the documentation generation module 160 to potentially include in a subsequent LLM prompt. As further described herein, due to context window size/token limits, the documentation generation module 160 may not be able to include all relevant workflow data and/or context in a single prompt to induce the LLM to generate a documentation document. The documentation generation module 160 may generate an intermediate LLM prompt based on less than all workflow data and/or context. For example, the documentation generation module 160 may generate a plurality of intermediate prompts based on at least some of the screen captures, associated metadata, and audio transcript, each intermediate prompt comprising different workflow information associated with different event triggers. Such prompts may induce the LLM to generate one or more intermediate documentation documents, such as one for each prompt of the plurality of intermediate prompts. An intermediate documentation document may describe a portion of the user's workflow. For example, each generated intermediate documentation document may describe different steps performed by the user in using app 180. In some embodiments, an intermediate documentation document can include contextual text phrases based on at least some of the screen captures included in the corresponding intermediate LLM prompt that was passed into the LLM. Advantageously, passing such intermediate documentation into the LLM for generation of a final documentation document can reduce processing times and/or memory requirements as the system is not passing screen captures in bulk in a single LLM call. The documentation generation module 160 may generate a final LLM prompt based on the generated intermediate documentation documents received from the LLM. For example, the documentation generation module 160 may provide all of the intermediate documentation documents to the LLM for the LLM to generate a final documentation document that describes all steps of the user's workflow. The final prompt can satisfy the context window size/token limit of the LLM.

The prompt can include information associated with one or more tools selected by the user, such as in the form of tool information, which enables the LLM 130 to generate a tool call that can be used by the AIS to communicate with a data processing service. Tool information may indicate, for example, how data that may be accessed by the LLM (via tool calls) is structured, such as in an ontology or other format. Tool information can indicate properties associated with a particular object type, such as an object type selected by the user in the user input at interaction 1. Tool information can include instructions for implementing a tool, instructions for generating a tool call, including instructions for formatting a tool call, tool implementation examples for executing one or more tool operations, and/or other information that may allow the LLM to provide more meaningful responses to the AIS. Tool implementation examples included in an LLM prompt can include pre-defined examples (e.g., the same for each use of the tool), user-selected or user-generated examples, and/or examples that are dynamically configured by the AIS 102 based on context.

Advantageously, supplementing a prompt with context, such as workflow information and/or tool information, may cause the LLM to generate responses to the prompt that are more useful (e.g., more relevant, accurate, and/or complete). Moreover, implementing AI system 102 to generate prompts, which can include context, may greatly reduce the burden of prompt design and prompt engineering on a user. Moreover, documentation generation module 160 can generate prompts that are more effective in inducing an LLM to generate workflow documentation, which may greatly improve the technical field of LLM systems.

Interaction 2 shows the AIS 102 providing a prompt, such as may be generated by documentation generation module 160, to the LLM 130. In response to receiving the prompt, at interaction 3 the LLM 130 provides an output to the AIS 102. The LLM output comprises text that may include a full or partial response to the provided task and/or information indicating additional information that may be requested by the AIS 102. For example, the LLM output can include a tool call formatted according to instructions in tool information included in the prompt.

In some examples, the LLM output includes a complete workflow documentation or an intermediate workflow documentation. The intermediate documentation may describe at least a portion of the workflow of the user. The intermediate documentation document may indicate additional workflow information (e.g., workflow data and/or context) that may be requested by the AIS 102.

In some embodiments, the AIS 102 (e.g., documentation generation module 160) and LLM 130 can engage in a back-and-forth interaction, such as by repeating interactions 2 and 3 in an iterative process). For example, as further described herein, the documentation generation module 160 may generate one or more LLM prompts, each LLM prompt including different workflow information, such as a different set of screen captures and associated transcripts. The LLM 130 may generate a response, such as intermediate workflow documentation (e.g., intermediate documentation document), for each LLM prompt. The documentation generation module 160 may generate an LLM prompt that includes each of the intermediate workflow documentation. The LLM prompt can induce the LLM to generate a response that includes a final workflow documentation (e.g., final documentation document). The final workflow documentation may describe (e.g., accurately, completely, clearly, and/or in detail) all of the workflow of the user, such as in using app 180. In some embodiments, the AIS 102 and LLM 130 may perform steps 2 and 3 in a closed loop to refine the LLM output. Based on received LLM output, the documentation generation module 160 may generate subsequent prompts having additional and/or different workflow data and/or context such that subsequent LLM responses are continuously refined until the LLM can generate a final documentation document (e.g., final workflow documentation) that describes (e.g., accurately, completely, clearly, and/or in detail) all of the user's workflow, such as in using app 180.

In some implementations, the AIS 102 can parse the LLM output to change a format of data of the LLM output. For example, the AIS 102 may convert a text string of the LLM output to a different data format, such as a data object format that is defined by an ontology. The AIS 102 may convert an LLM output to a data format that is compatible with data processing services 120. Advantageously, reformatting data output from an LLM, such as from one data type to another, may improve the technical field of LLMs such as by providing a system to facilitate integrating the LLM with a data processing service which may greatly expand or enhance the capabilities of LLMs.

If the output from the LLM at interaction 3 includes a tool call, the AIS 102 can generate a request to a data processing service 120 at interaction 4. The request can include the tool call text directly from the LLM output and/or some or all of the tool call text reformatted to be usable by the particular data processing service. The AIS 102 can communicate with the data processing services 120 via one or more API calls, HTTP requests, or the like. If the LLM output at interaction 3 does not include a tool call, the process may skip interactions 4-7.

In response to the request, the data processing service 120 can generate data output at interaction 5. For example, the data processing service output may be generated based on implementation of the tool call received at interaction 4. The data output may be formatted according to a structure specified by the data processing service 120, such as according to an ontology. For example, the data output may identify a data object having one or more properties and which can be formatted according to an ontology. Data output may be in various formats, some of which may not be recognizable by the LLM 130 (e.g., non-textual data).

In some examples, the AIS 102 can reformat the data output from the data processing service 120, such as to reformat a data object as a text string. The AIS 102 may parse the data output and extract one or more properties of the data object to be formatted as a string that may be provided to the LLM 130 to accurately "understand" and process data of the data output. Advantageously, the AIS 102 may greatly improve the technical field of LLMs such as by providing a system to facilitate integrating the LLM with data from various sources having various data types which may greatly expand or enhance the capabilities of LLMs.

Next, at interaction 6 the documentation generation module 160 can generate a subsequent prompt based on at least the data output from the data processing service. The subsequent prompt can include some or all of the data output (e.g., reformatted as a string), along with relevant context, such as context provided, generated, and/or accessed by context module 110. Thus, the subsequent prompt can include some or all of the initial prompt (interaction 2) and/or the LLM output (interaction 3). In some examples, a summary of the conversation history is provided in the subsequent prompt, rather than including the full text of the conversation history.

In response to receiving the subsequent prompt, the LLM 130 may generate a subsequent LLM output at interaction 7. The subsequent LLM output may include various information, similar to the first output received at interaction 3. For example, the subsequent LLM output may include a final response to the task, another tool call, and/or other information. In the example of FIG. 1, the subsequent prompt includes a final response, and does not include another tool call. The processes illustrated as interactions 2-6 may be repeated any number of times as the LLM makes additional tool calls to obtain further information and the data processing services outputs are provided back to the LLM.

At interaction 8 the AIS 102 generates a final response that is to provide to the user 150. The final response may include some or all of the subsequent LLM output and/or other information. The final response may be formatted according to a user selection, such as a string of text or data object (or link to data object stored in an ontology). A data object may be identified with a unique identifier associated with an object. The final response may include text, images, maps, interactive graphical user interfaces, datasets, database items, audio, actions, or other types or formats of information. In some implementations, the AIS 102 may modify the LLM output to generate the final response provided to the user. For example, the AIS 102 can parse the subsequent LLM output to change a format of data for inclusion in the final response. In some implementations, the AIS 102 may save the final response as a variable, which may be subsequently provided to the LLM.

Advantageously, the AIS 102 may improve the technical field of LLMs such as by improving the usefulness of LLM responses. LLM 130 may only output data having a certain format (e.g., data formatted as a string). Formatting the data output from the LLM may allow the LLM 130 to provide data that can be more useful to a user, such as if a user requires data in a non-string format such as for subsequent manipulation, functions, or processes.

As shown and/or described, AIS 102 can generate a response to a user input by interacting with LLM 130 and/or with data processing services 120. The AIS 102 can receive data from, and/or provide data to, the LLM 130 and/or data processing services 120. In some implementations, the AIS 102 may interact with the LLM 130 more or less than what is illustrated in FIG. 1, such as to generate a response for a given user input (and associated task or sub-task). In some implementations, the AIS 102 may interact with the data processing services 120 more or less than what is illustrated in FIG. 1, such as to generate a response for a given user input (and associated task or sub-task). In some implementations, the AIS 102 may interact with the data processing services 120 in response to every output from the LLM 130 (except for a final LLM output). In some implementations, the AIS 102 may interact with the LLM 130 in response to every output from the data processing services 120. The number of times the AIS 102 interacts with the LLM 130 and/or with the data processing services 120 may depend on at least the initial user input.

Figure 2:
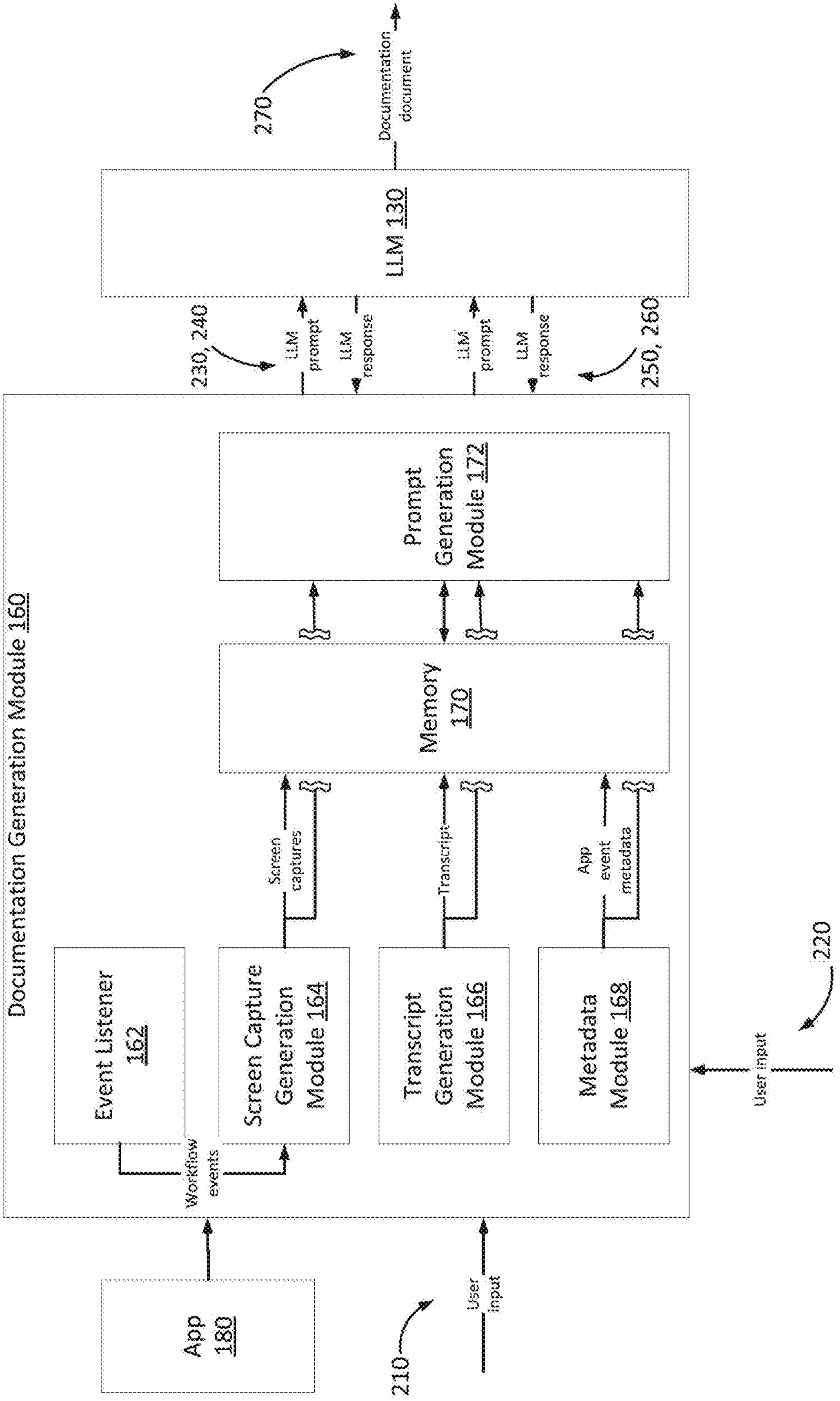
FIG. 2 is an example schematic input and output flow diagram illustrating how one or more modules of the AIS may interact to generate a documentation document.

FIG. 2 is an example flow diagram showing an example of inputs and outputs to the documentation generation module 160 in one embodiment. In this example, the documentation generation module 160 can be configured to receive one or more inputs 210, 220 and to access data originating from app 180, and generate and output a prompt 230 for LLM 130, such as an initial prompt. The documentation generation module 160 may be configured to process the one or more inputs 210, 220 and the workflow data such as to generate the LLM prompt 230. The documentation generation module 160 may be configured to access workflow data associated with interactions of the user with app 180 and/or actions performed by app 180 via an API call.

The documentation generation module 160 may be configured to receive one or more LLM responses 240 and generate and output subsequent prompts 250 for LLM 130. The documentation generation module 160 may be configured to process the LLM response 240 such as to generate a subsequent prompt 250. The documentation generation module 160 may be configured to receive and process subsequent LLM responses 260 and generate and output subsequent prompts 250 for LLM 130 in an iterative process, such as a closed loop, until the LLM 130 outputs documentation document 270. In some embodiments, as further described herein, the documentation generation module 160 may generate a single initial prompt 230 that can induce the LLM 130 to generate workflow documentation 270 without any iterative interaction.

In the embodiment of FIG. 2, the documentation generation module 160 includes an event listener 162, a screen capture generation module 164, a transcript generation module 166, a metadata module 168, a memory 170, and a prompt generation module 172. As shown in FIG. 2, inputs to the documentation generation module 160 may include user input 210, 220 and workflow data originating from software application 180. In some embodiments, portions of the documentation generation module 160 are performed on the user device, such as by a browser in which the app 180 is running. For example, the event listener 162, screen capture generation module 164, transcript generation module 166, and/or metadata module 168 may entirely or partially execute on the user device (e.g., user device 150) and communicate with the documentation generation module 160 that may be executing separately on the user device or in the cloud.

User input 210 includes user input indicative of starting a workflow capture session. For example, the user may interact with a graphical user interface ("GUI") and select to begin a workflow capture session, such as by selecting (e.g., clicking, tapping, pressing, and/or the like) a graphical element that causes the system to begin capture of workflow data and/or context (see FIG. 3A, for example). The GUI, as further described herein, may be provided by the interface module 104, such as by the AIS 102 and/or the user device 150. A document workflow capture session can include capturing workflow data and/or context to generate a prompt intended for an LLM. In some embodiments, user input indicative of starting a document workflow capture session may cause the event listener 162 and/or metadata module 168 to begin monitoring app 180, such as, for example, a web-based application running in a browser.

Responsive to user input indicating initiation of a workflow capture session, the AIS 102 may generate an alert or notification indicating that the interactions of the user with software application 180 are being monitored. The alert or notification can include a visual, auditory, or haptic alert. For example, the alert or notification can include visual, auditory, or haptic feedback. In some embodiments, the AIS 102 can generate an alert or notification for output by the AIS 102 and/or the user device 150. For example, the AIS 102 may cause visual indicia indicative of initiation of/ongoing monitoring to be displayed in a GUI provided by the AIS 102 and/or the user device 150 (see FIG. 3B, for example). In some examples, the AIS 102 may cause a speaker connected to (e.g., in communication with) the AIS 102 and/or the user device 150 to output a sound indicative of beginning of monitoring. In some examples, the AIS 102 may cause a user device 150 (or a component thereof) to vibrate, indicative of beginning of monitoring. In some embodiments, the AIS 102 may cause continuous or persistent display of visual alerts or notifications indicative of monitoring for visualization by the user, such as for the entire duration of a workflow capture session (e.g., until the system receives user input indicative of ending monitoring)

In some embodiments, user input 210 can include audio signals indicative of words spoken by the user. For example, after initiating a document workflow capture session, a user may audibly describe various portions (e.g., various steps) of the creation process of the document as the user creates the document via app 180. As further described herein, the documentation generation module 160 may be configured to record and/or transcribe the audio for potential inclusion in a prompt intended for processing by an LLM. The audio may be intended to provide the documentation generation module 160 with workflow context to increase the usefulness (e.g., accuracy, relevance, effectiveness, and/or the like) of an LLM response. For example, the audio (e.g., transcribed audio) that is added to a prompt may increase the level of completeness and/or detail with which the LLM generates workflow documentation that describes the user's use of app 180.

Software application 180 can include any available type of software product, such as any interactive software application that permits user interaction with the software product. This can include any software application that allows user input (e.g., allows users to input data, allows users to make selections, and/or the like) and/or user control of the software's behavior in some way (usually through a GUI). In some embodiments, software application 180 can include user-facing and/or end-user software. In some embodiments, software application 180 can include internal and/or proprietary software, including but not limited to, development tools, DevOps tools, middleware, infrastructure software, build systems, back-end system, and/or the like. Software application 180 can include web applications, desktop applications, and/or mobile applications.

The event listener 162 is configured to detect screen capture events as a user uses app 180. As described herein, screen capture events may include native and/or user-defined events (e.g., actions, occurrences) that, when detected (e.g., recognized) by the event listener 162, cause the screen capture generation module 164 to capture an image of the GUI associated with the app 180 (e.g., an image of the app GUI as seen by the user). The captured image may be of the app GUI at a time instance at or near the time of the event. For example, if the event listener 162 detects a mouse click (or any of the other screen capture events described herein), the event listener 162 may cause the screen capture generation module 164 to capture an image of the app GUI at a time instance at or near the time when the mouse click was detected. The time at which the event listener 162 detects an event may correspond to the time at which the user causes the event. For example, the event listener 162 may detect a mouse click at a time instance at or near the time that the user performs a mouse click action.

The event listener 162 may be in communication with app 180 such that event listener 162 can access data originating with app 180. The event listener 162 can include an event-handling architecture configured to monitor app 180 for various different native and/or user-defined actions and/or occurrences to trigger a screen capture. In some embodiments, the event listener 162 may monitor app 180 for event triggers at the system level or the app level. The event listener 162 may passively and/or actively monitor app 180 for event triggers. In some embodiments, the event listener 162 may integrate with app 180's internal event-driven architecture, such as via an API. In some embodiments, the event listener 162 may continuously or periodically check (e.g., query), such as in an open loop during the capture session, for changes in app data indicative of native and/or user-defined events.

The event-handling architecture may be implemented as an event loop (e.g., an open loop) that "listens" for event triggers. When an event occurs, the event listener 162 may call a callback function that causes the screen capture generation module 164 to capture an image of the app GUI at a time instance at or near the time of the event occurrence.

In some embodiments, the event listener 162 may be configured to filter out and/or ignore irrelevant and/or redundant event triggers. Irrelevant and/or redundant event triggers can include events that generally may be detected by the event listener 162, but which are not related to important aspects of the workflow of the user or do not provide additional helpful workflow information compared to that which has already been collected by the system. For example, a user may have a nervous habit of clicking a mouse multiple times or excessively scrolling through a browser UI. Such events may be similar to meaningful event triggers in the context of detection by the event listener 162, but collecting data associated with such events (e.g., screen captures, metadata, and/or the like) may not improve the system's ability to generate meaningful prompts to induce useful LLM responses, and can slow down processing times and use up memory. Thus, it is desirable to prevent such events from triggering data collection by the system. The event listener 162 can filter out and/or ignore such events without (or mitigating reduction of) losing meaningful workflow data. Irrelevant and/or redundant events can include repeated button clicks (e.g., clicking the same graphical element multiple times in rapid succession), repeated undo/redo action (e.g., interactions with a software application that undo and redo actions without introducing new steps), excessive mouse movements (e.g., without clicking or selecting), excessive page scrolling, and/or the like.

The event listener 162 may be configured to filter out and/or ignore such triggers based on identified patterns and/or sequences of user interaction. In some embodiments, the event listener 162 may be configured to filter out and/or ignore such triggers based on one or more thresholds (e.g., predetermined thresholds). For example, the event listener 162 may filter out triggers that do not satisfy one or more predetermined threshold, such as a predetermined time threshold or a distance threshold. The predetermined time threshold can include limits such as upper and lower limits. In some embodiments, for example, the event listener 162 may be configured to determine the time duration between subsequent triggers (e.g., time duration between subsequent clicks) and/or the time duration of certain user interactions (e.g., time spent scrolling a webpage). The event listener 162 may be configured to determine whether a determined time duration satisfies the predetermined time threshold based on a comparison between the determined time duration and a predetermined time threshold value. The predetermined time threshold value may correspond to lower or upper limits. For example, the event listener 162 may determine that a determined time duration does not satisfy the predetermined time threshold based on a determination that the determined time duration is less than the lower limit. In some examples, the event listener 162 may determine that a determined time duration does not satisfy the predetermined time threshold based on a determination that the determined time duration is greater than the upper limit. The event listener 162 may filter out and/or ignore such triggers. In some examples, the event listener 162 may determine that a determined time duration does satisfy the predetermined time threshold based on a determination that the determined time duration is at or within the lower or upper limits.

In some embodiments, a predetermined distance threshold can include limits such as upper and lower limits. In some embodiments, for example, the event listener 162 may be configured to determine a distance traveled such as a distance traveled by a cursor (e.g., quantity of pixels traversed) and/or a distance scrolled. The event listener 162 may be configured to determine whether a determined distance satisfies the predetermined distance threshold based on a comparison between the determined distance and a predetermined distance. The predetermined distance may correspond to lower or upper limits, which may be indicative of certain negligible behavior such as twitching, idle time, and/or the like. For example, the event listener 162 may determine that a determined distance does not satisfy the predetermined distance threshold based on a determination that the determined distance is less than the lower limit. In some examples, the event listener 162 may determine that a determined distance does not satisfy the predetermined distance threshold based on a determination that the determined distance is greater than the upper limit. The event listener 162 may filter out and/or ignore such triggers. In some examples, the event listener 162 may determine that a determined distance does satisfy the predetermined distance threshold based on a determination that the determined distance is at or within the lower or upper limits. In some embodiments, the event listener 162 may be configured to determine whether a value, a change, a rate of change, or a change in the rate of change of the distance satisfies a predetermined threshold.

In some embodiments, predetermined time and/or distance thresholds may be fixed or programmable. In some embodiments, predetermined time and/or distance thresholds may be set and/or modified by the user and/or the AIS 102 (e.g., by the documentation generation module 160) according to certain event types, such as any of the event types described herein.

In some embodiments, the event listener 162 may implement one or more filters (e.g., heuristic-based filters) to filter out certain triggers based on predefined rules that indicate which user interactions and corresponding triggers are likely to be trivial and/or redundant, and thus filtered out.

The screen capture generation module 164 is configured to capture images of the GUI provided by app 180. Responsive to an event trigger detected by the event listener 162, the screen capture generation module 164 may generate a screen capture of the app GUI. The screen capture generation module 164 may capture an image of the app GUI at a time instance at or near the time when the event is detected and/or occurs.

The screen capture generation module 164 may be configured to access the display content of app 180 (e.g., pixel data), such as via an API call. In some embodiments, the screen capture generation module 164 may be configured to access a screen buffer to directly read pixel data. Based on the obtained pixel data, the screen capture generation module 164 may generate a bitmap image that stores the color information for each pixel in the captured area. In some embodiments, the captured area may include the entire GUI displayed on a display of, for example, the user device 150. For example, the bitmap may include pixel data corresponding to the entire displayed app GUI.

In some embodiments, the captured area may include less than the entire app GUI. For example, the screen capture generation module 164 may be configured to capture an image of the app GUI within a certain number of pixels from the detected event or including only a pane or window in which the event was detected, such that the image data includes pixel data (e.g., raw pixel data or compressed pixel data in any available compressed image format) corresponding to less than the entire displayed app GUI. For example, if the user clicks on a first portion of the app GUI, the screen capture generation module 164 may generate an image of the app GUI that includes both pixel data corresponding to the first portion of GUI and pixel data corresponding to at least a portion of the surrounding display content. In some embodiments, the screen capture generation module 164 may be configured to automatically crop the captured image to within a certain number of pixels or some other area (e.g., a pane or window in which the event was detected) from the location of the detected event (e.g., the portion of the app GUI where the event occurred).

Advantageously, generating screen captures that capture the portion of the app GUI interacted with by the user and some surrounding display content (e.g., display content within a certain number of pixels of the detected event), the screen capture generation module 164 can increase computational resource efficiency such as by reducing processing and/or memory storage demands. Likewise, the screen capture generation module 164 may capture relevant image data in a small image size (e.g., an image that is smaller than capturing an image of the entire GUI) without reducing (or mitigating reduction of) the amount of relevant workflow information present in the captured image. This may allow the documentation generation module 160 to add more screen captures to a prompt to improve the usefulness of the LLM response, as each screen capture may utilize less of the token limit/context window of the LLM than does a screen capture that includes pixel data corresponding to the entire displayed app GUI.

In some embodiments, the screen capture generation module 164 may generate screen captures that capture less than all of the displayed app GUI according to a predetermined threshold, such as a predetermined pixel threshold. In some embodiments, predetermined pixel thresholds may be fixed or programmable. In some embodiments, predetermined pixel thresholds may be set and/or modified by the user and/or the AIS 102 (e.g., by the screen capture generation module 164) according to certain event types, such as any of the event types described herein. For example, different event types may correspond to different predetermined pixel thresholds such that associated screen captures may include different sized portions of the displayed app GUI. Screen captures may be produced and/or saved in any available type of image format, such as .png, .jpg, .tiff, and/or the like.

In some embodiments, the screen capture generation module 164 may be configured to automatically blur certain information displayed in the app GUI, such as private, sensitive, and/or confidential information. The screen capture generation module 164 may be configured to automatically blur such information in post processing. In some embodiments, the screen capture generation module 164 may be configured to implement any available type of image processing techniques, GUI analysis techniques, natural language processing/identification algorithms, and/or combinations thereof. For example, in some embodiments, the screen capture generation module 164 may be configured to identify such information via, for example, predefined keywords and/or patterns indicative of private, sensitive, and/or confidential information (e.g., names, identification numbers, and/or the like). For example, the screen capture generation module 164 may be configured to obtain text information for analysis by performing optical character recognition on a screen capture and/or receiving text displayed int the app 180 directly from the app 180, such as via an API connection between the screen capture generation module 164 and the app 180. In some embodiments, the screen capture generation module 164 may be configured to identify such information via any available type of machine learning model trained to recognize such information based on, for example, labeled data. The screen capture generation module 164 may be configured to leverage such algorithms to analyze content that is displayed in a screen capture (e.g., text, images, and/or the like) and classify the displayed content and/or corresponding portion of the screen capture as private, sensitive, and/or confidential. In some embodiments, the screen capture generation module 164 may be configured to analyze the entirety of the captured image, or only portions that are likely to contain private, sensitive, and/or confidential information. In some embodiments, automatic blurring may be user customizable such that a user may define which types of content should trigger blurring (e.g., which keywords and/or patterns).

Additionally or alternatively, the screen capture generation module 164 may be configured to automatically blur certain information displayed in the app GUI based on corresponding components in the codebase. In some embodiments, components in the codebase (e.g., GUI data) can correspond to various different private, sensitive, and/or confidential GUI elements. For example, such elements can include password fields, payment input fields, personally identifiable information (e.g., names, addresses, emails), internal metrics, other restricted content, and the like. Corresponding components in the codebase may be annotated with metadata or labels indicating that such components are associated with private, sensitive, and/or confidential information. During monitoring, the screen capture generation module 164 can analyze metadata associated with generated screen captures to access properties of various GUI elements such as associated labels. For example, the screen capture generation module 164 can correlate elements rendered in the GUI (e.g., images, text phrases, and/or the like) with the underlying GUI metadata and match GUI elements with their corresponding labels. The screen capture generation module 164 may generate a bounding box around the components of the screen capture that are associated with labels indicative of private, sensitive, and/or confidential information, such as further described herein.

Once identified, the screen capture generation module 164 may be configured to define a region for blurring, such as by generating a bounding box around the identified content. For example, the screen capture generation module 164 may be configured to determine x and y coordinates of the identified content based on the corresponding pixel data. The screen capture generation module 164 may then cause the bounded content to be blurred. For example, the screen capture generation module 164 may implement gaussian blurring such that pixels in the screen capture are smoothed in a way that reduces detail. In some examples, the screen capture generation module 164 may replace pixels in the defined region (e.g., the bounding box) with blocks of solid color (e.g., black boxes) to obscure the original content. In some embodiments, the screen capture generation module 164 may flag the content within a bounding box for attention by the user (e.g., for the user to manually blur, redact, or remove).

Figure 5:
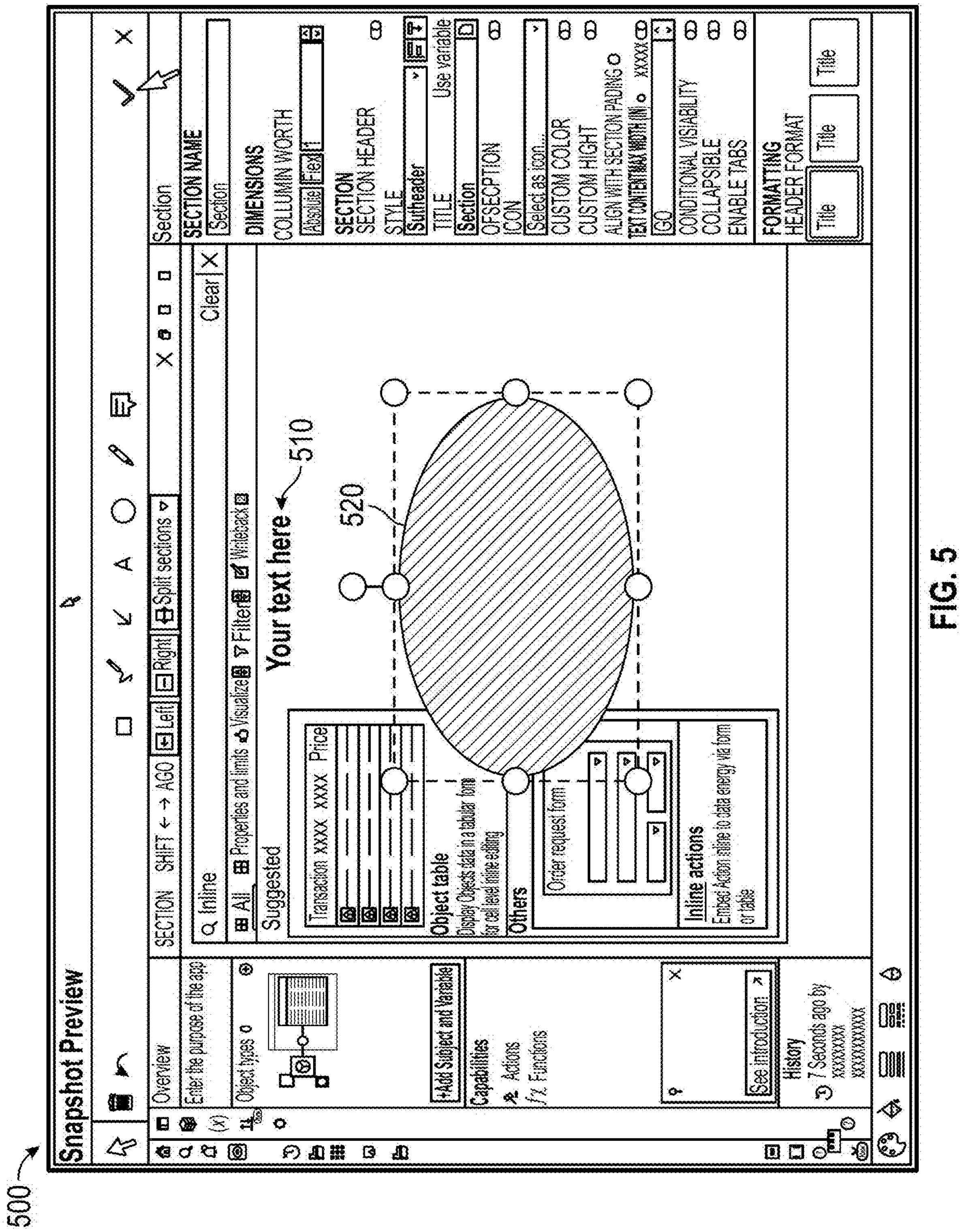

In some embodiments, the screen capture generation module 164 may be configured to permit manual modification of screen captures (e.g., annotating a screen capture, cropping at least a portion of a screen capture, adding/removing/adjusting blurred portions of a screen capture, and/or the like), such as by a user (see FIG. 5, for example).

In some embodiments, the screen capture generation module 164 may be configured to generate video recordings of the user's workflow based on detected event triggers. The screen capture generation module 164 may record the user's screen for a certain period of time (e.g., a predetermined period of time) before and/or after detection of an event trigger. The video recording can include frames marked with timestamps that correspond to time instances at which an event trigger was detected. The screen capture generation module 164 may automatically mark such frames of the video recording based on metadata obtained from the metadata module 168. Marked frames can permit the screen capture generation module 164 to parse through the video recording and generate still images (e.g., screen captures) of the marked frames of the video recording. Marked frames of the video recording may be associated with important aspects of the workflow of the user. In some embodiments, the screen capture generation module 164 may be configured to permit manual modification of screen captures of frames of the video recording (e.g., annotating a screen capture of a frame of a video recording, adding/removing/adjusting blurred portions of a screen capture of a frame of a video recording, cropping at least a portion of a screen capture of a frame of a video recording, and/or the like), such as by a user.

The transcript generation module 166 is configured to generate a transcript based on recorded audio. For example, the transcript generation module 166 may be configured to generate a transcript based on detected audio signals indicative of words spoken by the user. The transcript generation module 166 may receive audio signals from an audio input device, such as a microphone. In some embodiments, the transcript generation module 166 may be implemented as a web speech API. In some embodiments, the transcript generation module 166 may be configured to implement automatic speech recognition (ASR) software that can interpret human speech and convert it to text. During a workflow capture session, the user may audibly describe the steps taken in using app 180. The transcript generation module 166 may transcribe the received audio to generate text to potentially add to an LLM prompt to increase the usefulness of an LLM response. For example, the generated transcript may increase the level of completeness and/or detail with which the LLM generates workflow documentation that describes the user's use of app 180.

In some embodiments, the transcript generation module 166 may record audio and store the recorded audio in a format (e.g., .wav, .mp3, and/or the like) for pre-processing. The transcript generation module 166 may filter the recorded audio using a filter or combination of filters (e.g., Kalman filter, low-pass filter, high-pass filter, band-pass filter, and/or the like) to reduce captured noise. In some embodiments, the transcript generation module 166 may divide the recorded audio into segments for pre-processing. The transcript generation module 166 may be configured to extract features from the pre-processed audio. The features may correspond to various different speech content. In some embodiments, the transcript generation module 166 may be configured to modify the transcript in post-processing, such as by modifying (e.g., adding, removing, changing) punctuation and/or capitalization, formatting the text, and/or making spelling/grammar corrections. The final output may include a text transcript of the recorded audio, which may be formatted and/or saved in any available text format (e.g., txt, docx, and/or the like).

The transcript generation module 166 may be configured to permit manual modification (e.g., adding, removing, and/or changing text, spelling, grammar, punctuation, format, and/or the like) of a generated audio transcript, such as by a user. For example, the user may modify the generated transcript (see FIG. 4B, for example).

In some embodiments, the transcript generation module can update prior generated transcripts with subsequently recorded audio. For example, the transcript generation module 166 may generate a transcript based on newly recorded audio, such as described herein. The transcript generation module 166 may retrieve a transcript already stored in memory (e.g., a first transcript), and append the new transcript (e.g., a second transcript) to the first transcript to generate an updated transcript that includes new contextual information, such as new description of one or more steps of a user's workflow. The documentation generation module may generate a prompt based on the updated transcript that induces an LLM to generate an updated documentation document.

The metadata module 168 is configured to capture metadata associated with the software application 180, such as metadata associated with detected event triggers. In some embodiments, captured metadata may be obtained directly from the app 180 and/or a browser where the app 180 is executing. Obtaining metadata directly from these sources, rather than only extracting metadata from an image of video file of the app 180, may provide more accurate, extensive, and complete information that is usable by the LLM in producing relevant workflow documentation. As an example, the app 180 and/or browser may provide metadata including information such as name, properties, location, and/or the like of an interface element clicked by the user (that caused the event trigger). Metadata may include any type of information associated with the app 180 at the time of the event trigger. For example, metadata may include an event type, a timestamp, text content of a target element, position of the target element, target key, document file information, timestamps, document properties, versioning metadata, security and permissions, software application data, formatting data, geolocation data, embedding objects and/or links, and/or the like.

Captured metadata may permit the AIS 102 (e.g., documentation generation module 160) to correlate generated screen captures with generated audio transcripts such that screen captures and corresponding transcribed audio are time aligned. For example, a generated screen capture may have an associated timestamp that is the same or similar to that of a portion of transcribed audio. The timestamp of the generated screen capture and/or of the portion of transcribed audio may be the same or similar to that of the corresponding detected event trigger. The portion of transcribed audio may describe what is displayed in the screen capture. In some embodiments, the screen captures and transcribed audio may be time aligned prior to processing by an LLM. In some embodiments, the metadata module 168 may be configured to add metadata to an LLM prompt (e.g., send metadata to prompt generation module 172) intended for an LLM such that the LLM can time align screen captures and transcribed audio for generation of a documentation document.

The metadata module 168 may be in communication with app 180 such that metadata module 168 can access data originating with app 180. For example, the metadata module 168 may access data from app 180 via an API call. Metadata module 168 may be in communication with other modules of the documentation generation module 160. For example, the metadata module 168 may be in communication with the event listener 162, screen capture generation module 164, and/or the transcript generation module 166. When a screen capture event is detected, the metadata module 168 may capture the associated metadata, such as a timestamp corresponding to the time at which the event was detected and/or occurred. In some embodiments, the metadata module 168 may associate the metadata (e.g., the timestamp information) with the corresponding generated screen capture and corresponding recorded audio (e.g., a portion of the recorded audio). For example, the metadata module 168 may monitor the event listener 162, screen capture generation module 164, and/or transcript generation module 166 such that the metadata module 168 can associate the captured metadata with the corresponding screen capture and/or recorded audio that are generated and/or recorded at or near the same time as the detected event trigger.

Memory 170 can include any computer readable storage medium and/or device (or collection of data storage mediums and/or devices), including, but not limited to, one or more memory devices that store data, including without limitation, dynamic and/or static random-access memory (RAM), programmable read-only memory (PROM), erasable programmable read-only memory (EPROM), electrically erasable programmable read-only memory (EEPROM), optical disks (e.g., CD-ROM, DVD-ROM, and/or the like), magnetic disks (e.g., hard disks, floppy disks, and/or the like), memory circuits (e.g., solid state drives, random-access memory (RAM), and/or the like), and/or the like. Such stored data can be processed and/or unprocessed data obtained from one or more modules of the documentation generation module 160, such as event listener 162, screen capture generation module 164, transcript generation module 166, and/or metadata module 168. Stored data can be processed and/or unprocessed data obtained from the app 180. Stored data can be processed and/or unprocessed data obtained from an LLM response (e.g., a response from LLM 130). Stored data can be processed or unprocessed data obtain from other components of the AIS 102, such as user input, context, tool information, and/or the like.

Each time an event trigger is detected, the corresponding screen capture and metadata may be stored in the memory 170, which may reside on the user device, the AI system, and/or a network-accessible storage location. For example, a screen capture and associated timestamp may be stored in the memory 170. In some embodiments, at least a portion of the transcribed audio (e.g., generated transcript) and corresponding metadata may be stored in memory 170. For example, one or more portions of a generated transcript and associated timestamps may be stored in the memory 170.

A workflow capture session may last until, for example, the documentation generation module 160 receives user input 220. User input 220 includes user input indicative of ending a workflow capture session. For example, the user may interact with a GUI provided by the interface module 104 and select to end a workflow capture session, such as by selecting (e.g., clicking, tapping, pressing, and/or the like) a graphical element that causes the system to end capture of workflow data and/or context (see FIG. 3A, for example). Responsive to user input indicating end of a workflow capture session, the documentation generation module 160 (or one or more components thereof) ceases monitoring the user's use of app 180, such as in performing the particular workflow, such that the system no longer captures workflow data. For example, the event listener 162 and/or metadata module 168 stop monitoring app 180.

Responsive to user input indicating end of a workflow capture session, the AIS 102 may generate an alert or notification indicating that the interactions of the user with software application 180 are no longer being monitored. The alert or notification can include a visual, auditory, or haptic alert. For example, the alert or notification can include visual, auditory, or haptic feedback. In some embodiments, the AIS 102 can generate an alert or notification for output by the AIS 102 and/or the user device 150. For example, the AIS 102 may cause visual indicia indicative of ending monitoring to be displayed in a GUI provided by the AIS 102 and/or the user device 150 (see FIG. 3B, for example). In some examples, the AIS 102 may cause a speaker connected to (e.g., in communication with) the AIS 102 and/or the user device 150 to output a sound indicative of ending monitoring. In some examples, the AIS 102 may cause a user device 150 (or a component thereof) to vibrate, indicative of ending monitoring. In some embodiments, the AIS 102 ceases causing display of any visual alerts or notifications that were displayed during the workflow capture session.

In some embodiments, user input 220 can include user input indicative of the user modifying the workflow information, such as described herein. For example, the user may interact with a GUI provided by interface module 104 that permits the user to interact with the stored workflow information (see FIGS. 4A-5, for example), such as to select particular screen captures to be included in the workflow information provided to the LLM. For example, user input 220 can include a user selecting or deselecting, via the GUI, one or more screen captures. The selected screen captures may be included in workflow information provided to the LLM, whereas the deselected screen captures are not. In some embodiments, one or more generated screen captures may be automatically selected prior to the user manually selecting/deselecting any screen captures. For example, the system may automatically determine that two or more sequential captures are near identical and likely would not improve workflow documentation.

As further described herein, the interface module 104 may provide one or more GUIs that provide editing tools to permit user modification (e.g., annotating, adding, removing, editing, changing, and/or the like) of the workflow data and/or context. In some embodiments, user input 220 can include the user manually blurring and/or cropping, via the GUI, at least a portion of one or more screen captures. In some embodiments, user input 220 can include the annotating, via the GUI, one or more screen captures. In some embodiments, the user input 220 can include the user editing, via the GUI, one or more portions of a generated transcript.

In some embodiments, user input 220 can include instructions intended to instruct the LLM to generate workflow documentation that describes the user's use of app 180. For example, the user input 220 can include user input indicative of the user customizing, editing, modifying, and/or the like, at least a portion of instructions generated by the prompt generation module 172, such as based on a particular documentation. The instructions may indicate a natural language request for workflow documentation to be created.

Prompt generation module 172 is configured to generate a prompt to an LLM (e.g., LLM 130). The prompt may be generated based on data provided by one or more modules of the documentation generation module 160, such as the event listener 162, screen capture generation module 164, transcript generation module 166, metadata module 168, and/or memory 170. In some embodiments, the prompt may be generated based on data provided directly from the screen capture generation module 164, transcript generation module 166, and/or metadata module 168. In some embodiments, the prompt may be generated based on data obtained from memory 170, which may include workflow data and/or context, such as workflow data and/or context modified by a user. User-modified workflow data and/or context can include blurred screen captures, cropped screen captures, annotated screen captures, edited portions of generated transcripts, edited instructions, and/or the like. In some embodiments, the memory 170 may indicate that one or more stored screen captures have been deselected by the user such that the prompt generation module 172 does not retrieve the one or more deselected screen captures for prompt generation.

The prompt generation module 172 may generate instructions that are intended for the LLM. The prompt generation module 172 may generate instructions based on workflow data and/or context captured during a workflow capture session, such as workflow data and/or context that is selected to be provided to the LLM. The instructions may indicate the workflow data and/or context to be included in the documentation document, and how such workflow information should be formatted/presented in the document. The instructions may indicate a level of detail with which the documentation document should describe workflow of the user. In some embodiments, the instructions may be intended to instruct the LLM to generate an intermediate documentation document that describes at least a portion of the interactions of the user with app 180 and/or actions performed by the app 180 (e.g., fewer than all steps associated with the workflow of the user in using app 180). In some embodiments, the instructions may be intended to instruct the LLM to generate a final documentation document that describes all interactions of the user with app 180 and/or actions performed by app 180 (e.g., all steps associated with the workflow of the user in using app 180).

In some embodiments, the prompt generation module 172 may generate a prompt after the workflow capture session has ended (e.g., after the system, or one or more components thereof, stops monitoring interactions of the user with app 180 and/or actions performed by app 180). The prompt generation module 172 may generate a prompt that includes at least instructions to generate a documentation document, one or more screen captures and associated metadata, and/or one or more portions of generated transcript and associated metadata. For example, the generated prompt may include at least a portion of the instructions, one or more selected screen captures and associated metadata, and/or one or more portions of generated transcript and associated metadata.

The prompt generation module 172 may be configured to determine how much workflow data and/or context to include in a single prompt based on the token limit/context window of the LLM. Each of the workflow data and/or context, when added to an LLM prompt, take up part of the token limit. Thus, the prompt generation module 172 may not be able to include, for example, all generated screen captures and/or all portions of the generated transcript in a single prompt. The prompt generation module 172 may be configured to divide the selected screen captures into distinct sections (e.g., each selected screen capture appears in only one section). For example, the prompt generation module 172 may be configured to determine, based on the token limit/context window and the captured workflow data to be included in an LLM prompt, one or more workflow sections. A workflow section may correspond to the entire workflow capture session (e.g., the quantity of workflow data and/or context is such that all selected screen captures can be included in a single prompt) or to a portion of the workflow capture session. A workflow section can include one or more selected screen captures and associated metadata, such as a subset of the selected screen captures and associated metadata). A workflow section can include one or more corresponding portions (e.g., a subset of portions) of the generated transcript that describe the workflow associated with the selected screen captures, such as portions of transcript with the same or similar timestamps as those of the selected screen captures.

In some embodiments, based on the token limit/context window, the prompt generation module 172 may be configured to generate an initial prompt 230 that induces the LLM 130 to generate an intermediate documentation document that describes a portion of the user's use of app 180, such as in performing the particular workflow. The prompt 230 may include a workflow section (e.g., a first workflow section), such as a subset of the selected screen captures and associated metadata, and/or a subset of the portions of the generated transcript. The prompt 230 may include instructions to generate an intermediate documentation document.

Each intermediate documentation document may correspond to a discrete section of a final documentation document to be generated by the LLM. The intermediate documentation document may include the one or more selected screen captures that were passed into the LLM via the corresponding LLM prompt. Each screen capture may be appended with associated metadata, such as event information as described herein. For example, each screen capture may be appended with information indicating which keys were pressed, whether a mouse was clicked, a timestamp, other event information, and/or other metadata. The intermediate documentation document may include the portion(s) of generated transcript passed into the LLM via the prompt. The portion(s) of generated transcript may be positioned proximate to corresponding screen captures.

The LLM 130 may output a response 240 that includes the intermediate documentation document. The intermediate documentation document may describe an initial step or set of steps (e.g., a first step or set of steps) performed by the user in using app 180. The initial intermediate documentation document may be a first intermediate documentation document that corresponds to a first section of a final documentation document to be generated by the LLM. The prompt generation module 172 may be configured to receive the response 240 and may store the response in the memory 170.

The prompt generation module 172 may be configured to generate subsequent prompts 250 to induce subsequent LLM responses 260. For example, based on the quantity of determined workflow sections, the prompt generation module 172 may be configured to generate one or more LLM prompts. In some examples, the quantity of determined workflow sections may correspond to the quantity of prompts to be generated by the prompt generation module 172. In some examples, the quantity of workflow sections may correspond to the quantity of intermediate documentation documents generated by the LLM 130. The prompt generation module 172 may be configured to receive subsequent LLM responses 260 and store such responses in the memory 170.

Each subsequent prompt 250 may include a corresponding workflow section and induce the LLM 130 to generate a corresponding intermediate documentation document. For example, a second generated LLM prompt 250 may induce the LLM to output a corresponding response 260 that includes a second intermediate documentation document. The second intermediate documentation document may describe a second step or set of steps performed by the user in using the app 180. The second intermediate documentation document may correspond to a second section of the final documentation document to be generated by the LLM. The prompt generation module 172 and LLM 130 may repeat this process in an iterative manner (e.g., a closed loop) until an LLM prompt and corresponding intermediate documentation document have been generated for each determined workflow section. Each intermediate documentation document may be stored in the memory 170, as described herein.

In some embodiments, the prompt generation module 172 may be configured to generate an LLM prompt based at least on instructions to generate workflow documentation and on the intermediate documentation documents. For example, the LLM prompt may include the instructions and each of the generated intermediate documentation documents. Each intermediate documentation document may correspond to a section of a final documentation document (e.g., documentation document 270) to be generated by the LLM 130. The LLM prompt may induce the LLM to generate documentation document 270. The documentation document 270 may describe the entirety of the user's use of app 180, such as in performing the particular workflow during the workflow capture session. For example, the documentation document 270 may describe all steps performed by the user in using app 180. The documentation document 270 may include all of the selected screen captures and appended metadata. The final documentation document may include all portions of the generation transcript.

In some embodiments, generated documentation documents may be interactive. For example, in addition to plain text, generated documentation documents may include videos, embedded links, and/or other elements with which a user can interact (e.g., select).

In some embodiments, the documentation generation module 160 may be configured to compare generated documentation documents to previously generated documentation documents to determine whether previously generated documentation documents are outdated. For example, the documentation generation module 160 may flag documentation documents that it determines are outdated.

Example User Interfaces

Figure 3A:
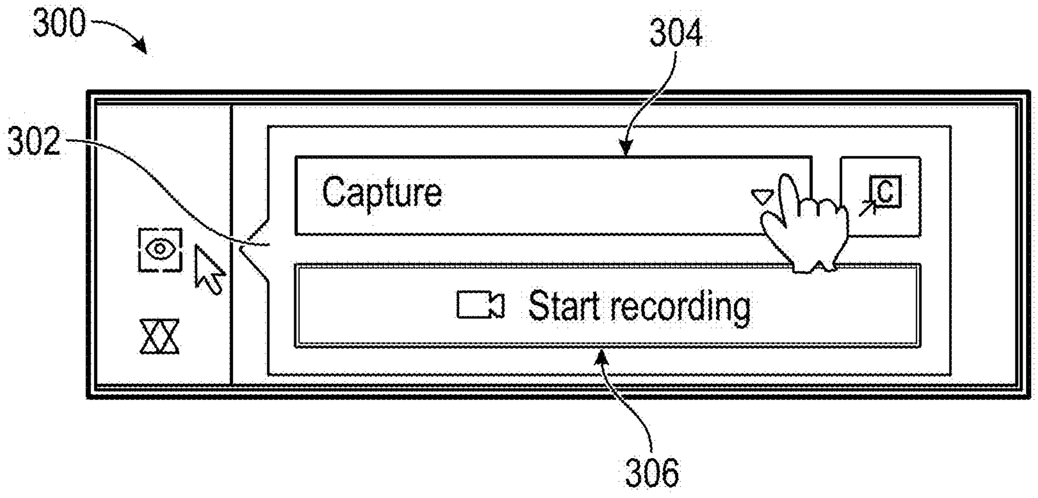
FIGS. 3A-6 illustrate example user interfaces associated with an artificial intelligence system for interacting with an LLM.

FIG. 3A illustrates an example user interface 300A. The user interface 300A may be an interactive graphical user interface. The user interface 300A may be displayed by a computing device, such as user device 150 of FIG. 1, which may comprise a computer, laptop, mobile device, tablet, phone, and/or the like. In some implementations, user interface 300A is displayed on the user device as part of an extension or plug-in to a browser where the app 180 is executed. In some embodiments, the user interface 300A can be displayed in a scroll-down menu of a mobile device and/or tablet. The user interface includes controls to allow the user to start and stop a workflow capture session.

User interface 300A can receive one or more user inputs. User interface 300A can facilitate capture of workflow data and/or context as a user uses a software application (e.g., app 180). In some embodiments, the user device 150 may receive user input via user interface 300A, which may then allow the user device 150 and/or AIS 102 to perform one or more operations based on the user input, such as capturing workflow data and/or context associated with interactions of the user with a software application and/or actions performed by a software application.

User interface 300A can include an action pane 302A. The action pane 302A can include an action field 304A and a graphical element 306A to begin or end the selected action. The action field 304A can include a drop-down menu displaying one or more actions that may be performed by the AIS 102. A user may visualize a list of available actions via the drop-down menu of action field 304A. In the embodiment of FIG. 3A, a user has selected "capture" as the action to be performed by the AIS 102. The user may select the graphical element 306A to cause the AIS to begin capture of the user's workflow, such as described herein. For example, the AIS may initiate monitoring of the user's use of app 180, such as in performing a particular workflow, and capture associated workflow data and/or context to potentially add to an LLM prompt. In some embodiments, the user may select the graphical element 306A again to cause the AIS to end capture of the user's workflow. For example, the AIS 102 may end monitoring of the user's use of app 180, such as in performing the particular workflow, and no longer capture associated workflow data and/or context. Selection of graphical element 306A by the user may cause generation or cessation of an alert or notification indicative of initiating or ending monitoring, such as may be output by the AIS 102 and/or the user device 150. The example of FIG. 3A is not intended to be limiting. Various actions are available to the user that can be performed by the AIS 102 and/or user device 150. For example, a user may select an option from the action field 304A that causes the AIS 102 to generate a new documentation document from already captured workflow information. In some examples, a user may select an option to add new workflow information to an already captured workflow to generate updated documentation.

Figure 3B:
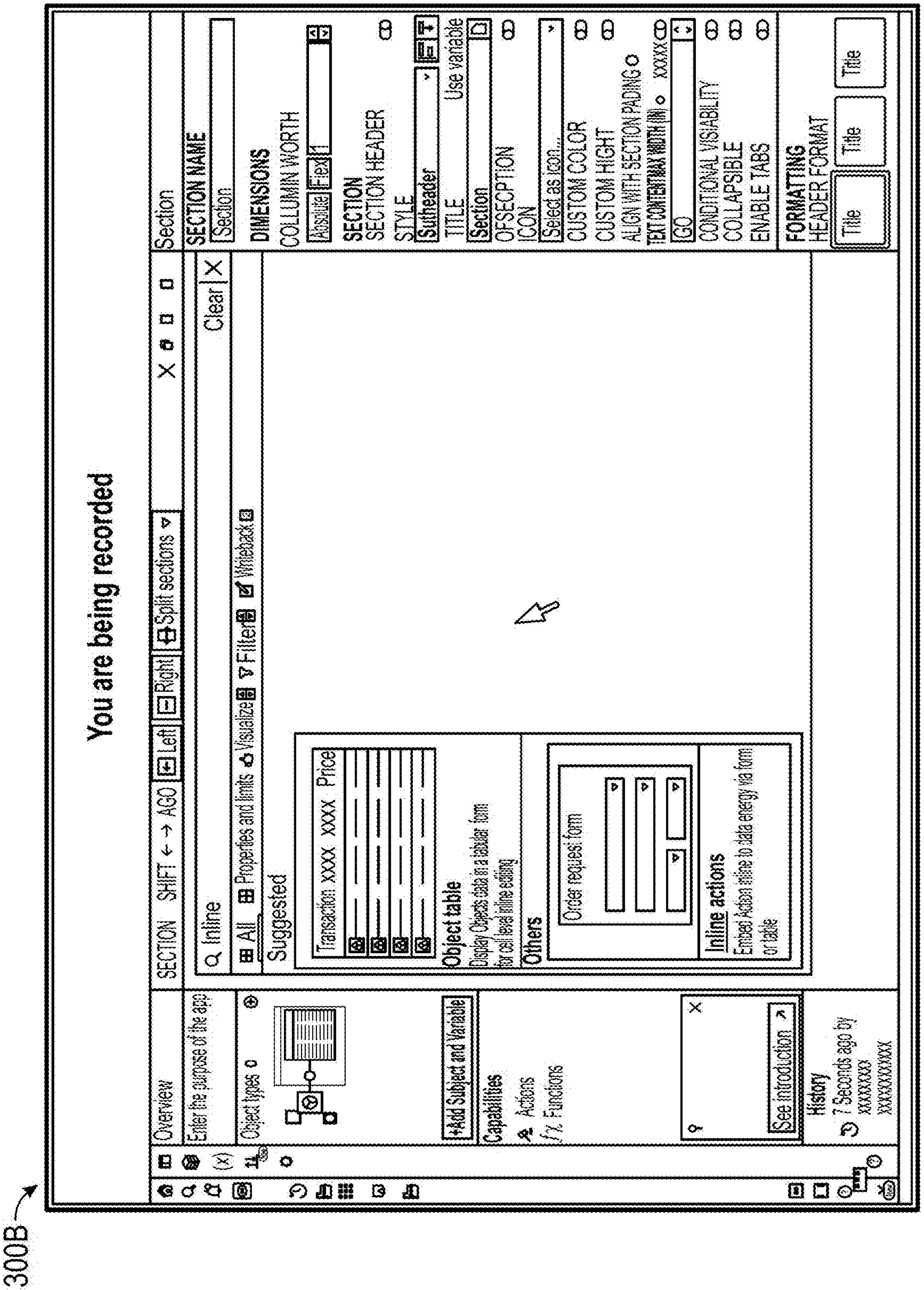

FIG. 3B illustrates an example user interface 300B. The user interface 300B may be an interactive graphical user interface. The user interface 300B may be displayed by a computing device, such as user device 150 of FIG. 1, which may comprise a computer, laptop, mobile device, tablet, phone, and/or the like. The user interface 300B may be accessible via user interface 300A. For example, user interface 300B may be displayed on the user device 150 as part of an extension or plug-in to a browser where the app 180 is executed. In some embodiments, user interface 300B is accessible (e.g., visualized, interactable) by the user only via user interface 300A, such as after selection of "capture" in the action field 304A shown and/or described in FIG. 3A. In some embodiments, user interface 300B is accessible only via user interface 300A during monitoring of workflow of the user. In some embodiments, the user interface 300B may be a native user interface such as a native user interface of software application 180 or a native interface of AIS 102. For example, user interface 300B may be any user interface visualized by the user as the user interacts with software application 180 in performing a particular workflow.

User interface 300B can include an alert (or notification) 308B. As described herein, the AIS 102 can cause generation and output of an alert, such as in response to user initiation of a workflow capture session. For example, after selecting graphical element 306A (FIG. 3A), the AIS 102 may generate an alert 308B and output the alert in user interface 300B. In some embodiments, the AIS 102 causes continuous or persistent display of alert 308B in the user interface 300B. For example, the AIS 102 may cause display of the alert 308B for visualization by the user for the entire duration of the workflow capture session, such as until the user selects graphical element 306A (FIG. 3A) to end monitoring. In the example embodiment of FIG. 3B, the alert 308B includes the text phrase, "You are being recorded." However, this is not intended to be limiting. The AIS 102 can generate alerts that may or may not include text. In some embodiments, the AIS 102 may cause display of a graphical icon having a shape, color, and/or pattern (e.g., a solid red circle) that indicates to the user that a workflow capture session is ongoing. In some embodiments, after a user has selected graphical element 306A (FIG. 3A) to end monitoring, the AIS 102 may generate a new alert or notification, or update alert 308B to indicate that the workflow capture session has ended. In some embodiments, responsive to the user ending monitoring, the AIS 102 may cease causing display of alert 308B such that alert 308B is no longer displayed in the user interface 300B.

Figure 4A:
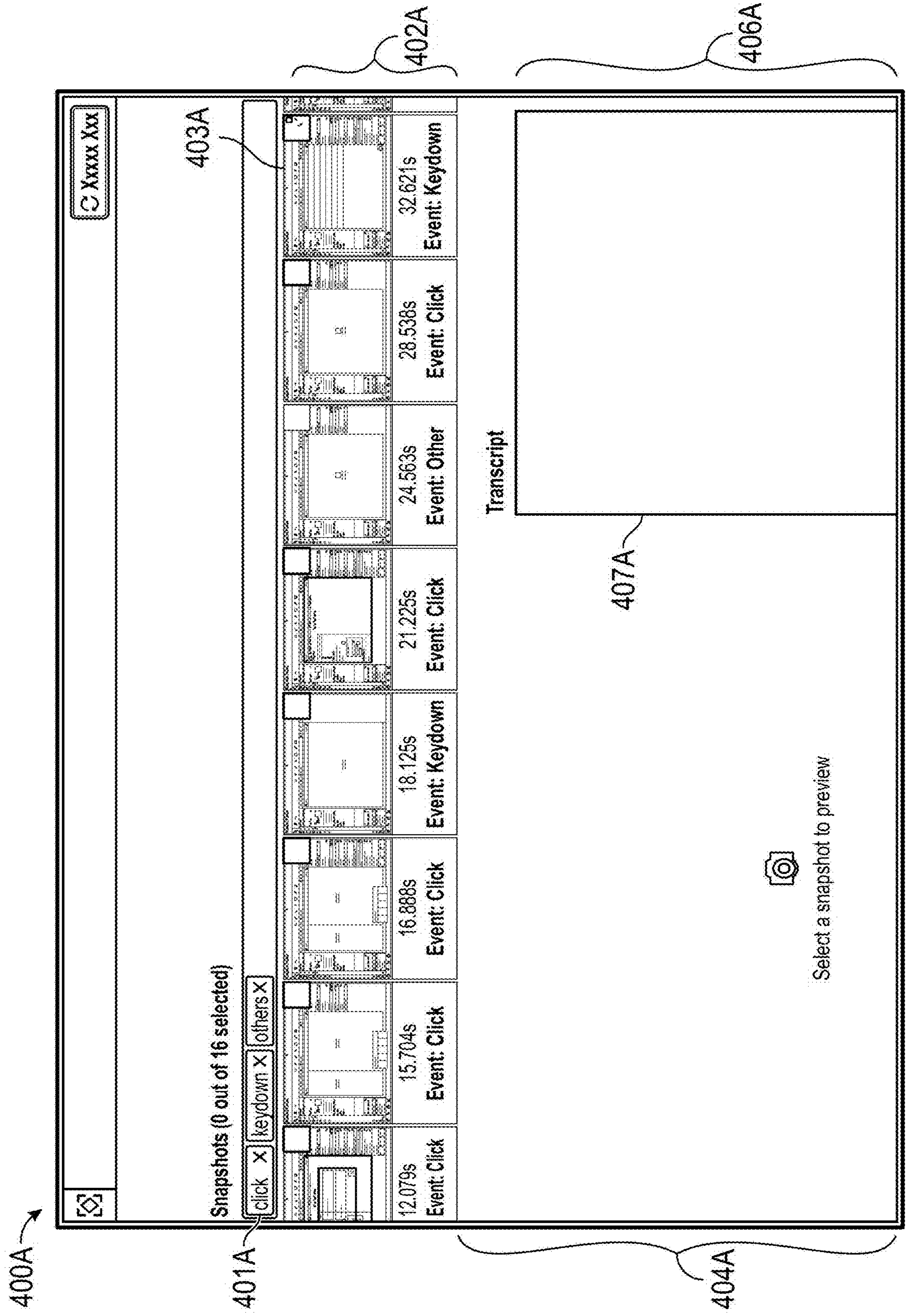
Figure 4B:
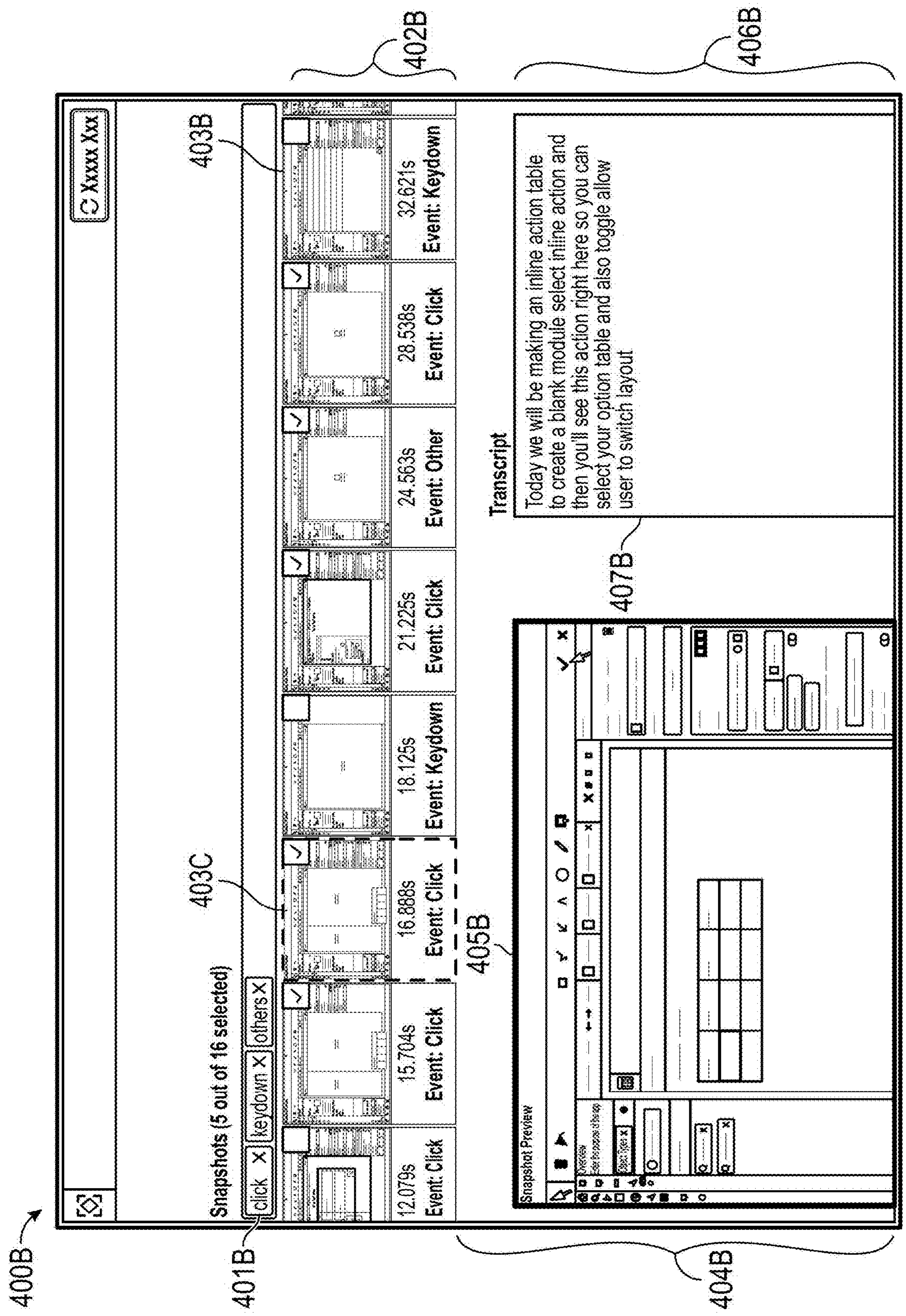

FIGS. 4A-4B illustrate example interactive user interfaces 400A, 400B that may be displayed by a computing device, such as user device 150 of FIG. 1 to allow reviewing, editing, or supplementing workflow information before sending such workflow information to the LLM.

User interface 400A can include an event trigger pane 401A, a screen capture selection pane 402A, a screen capture preview pane 404A, and a transcript pane 406A. In this example, the event trigger pane 401A can include one or more graphical elements representative of an event trigger detected by AIS 102 (e.g., event listener 162) during a capture session. For example, the graphical elements may be labeled with text phrases indicative of the event trigger. A user may interact with the graphical elements. For example, the user may deselect an event trigger, after which the event trigger will no longer be displayed in the pane 401A, and screen captures that were obtained in response to the now-deselected event trigger are no longer displayed in the screen capture pane 402A.

In the embodiment of FIG. 4B, the user has selected event triggers corresponding to "click," "keydown," and "other," which are displayed in the event trigger pane 401A. However, this is not intended to be limiting. The user can select any available event trigger, such as described herein. "Click" and "keydown" may be native events, whereas "other" may be a custom event. Selection of an event trigger may cause the screen capture selection pane 402A to populate with screen captures associated with the selected event trigger, as further described herein. For example, the screen capture selection pane 402A may automatically display screen captures associated with a selected event trigger(s). The screen capture selection pane 402A may automatically update based on selected and/or deselected event triggers. For example, the screen capture selection pane 402A may display additional screen captures and/or remove screen captures from being displayed based on selected and/or deselected event triggers.

Screen capture selection pane 402A may include thumbnail images 403A representative of the screen captures generated by AIS 102 (e.g., screen capture generation module 164) during a capture session. The screen capture selection pane 402A may include thumbnail images 403A for each of the generated screen captures. In the embodiment of FIG. 4B, the screen capture pane 402A displays thumbnail images 403A in a row (e.g., an image gallery), with which a user may interact. For example, a user may scroll left or right to view additional thumbnail images that may not be currently shown in user interface 400A. Each thumbnail image 403A in the screen capture pane 402A can include indicia of whether the screen capture is selected to be added to an LLM prompt. For example, selected screen captures may be indicated by a box with a checkmark, whereas deselected/unselected screen captures may be indicated by an empty box or the absence of a box altogether. Each thumbnail image 403A can be appended with various data (e.g., metadata), such as the file size of the stored screen capture, a timestamp of the stored screen capture, an event type that triggered generation of the screen capture, and/or the like. In the embodiment of FIG. 4B, the screen capture thumbnails are appended with timestamps and event triggers such as "click," "keydown," and "other." However, this is not intended to be limiting. The screen capture thumbnails may be appended with other associated metadata. The screen capture selection pane 402A may display thumbnail images associated with multiple different selected event triggers, such as event triggers displayed in the event trigger panel 401A described herein.

Screen capture preview pane 404A may provide an enlarged view of a thumbnail image 403A such that a user can better see the contents of the previewed screen capture. In the embodiment of FIG. 4B, the screen capture pane 404A is empty. In some embodiments, the screen capture pane 404A may not populate with an enlarged view until the user selects a screen capture thumbnail for viewing (See FIG. 4B, for example).

Transcript pane 406A can include a transcript field 407A that displays at least a portion of the transcript generated by the AIS 102 (e.g., transcript generation module 166). The transcript field 407A may automatically populate with text phrases to display the entirety of the generated transcript. The transcript field 407A may display the entire generated transcript regardless of which screen captures have been selected or deselected. In some embodiments, the transcript field 407 may display only a portion of the generated transcript. For example, the transcript field 407A can automatically display one or more portions of the generated transcript that is associated with a currently selected screen capture (see FIG. 4B, for example). In some embodiments, the transcript field 407A may display the entire generated transcript and indicate (e.g., highlight, bold, underline, italicize, change text color, change font, and/or the like) one or more portions of generated transcript that are associated with the currently selected screen capture. Transcript field 407A can receive user input, such as modifying (e.g., adding, removing, editing, changing, and/or the like) any of the text of the generated transcript. For example, a user may modify any of the generated transcript to fix any mistakes, include additional information, and the like, which can modify the context of the screen capture. A device or system may store the modified transcript in memory for retrieval by AIS 102 to add to an LLM prompt. In the example embodiment of FIG. 4B, the transcript field 407A is empty. In some embodiments, the transcript field 407A may not populate with generated transcript until the user has selected a screen capture thumbnail, such as for viewing.

Moving to FIG. 4B, user interface 400B can include an event trigger pane 401B, a screen capture selection pane 402B, a screen capture preview pane 404B, and a transcript pane 406B. The event trigger pane 401B can include one or more features and/or functionalities as described with respect to event trigger pane 401A shown and/or described in FIG. 4B. The screen capture pane 402B may include one or more features and/or functionalities as described with respect to screen capture pane 402A shown and/or described in FIG. 4B. The transcript pane 406B may include one or more features and/or functionalities as described with respect to transcript pane 406A shown and/or described in FIG. 4B. For example, the transcript pane 406A includes a transcript field 407B, which can include one or more features and/or functionalities as described with respect to transcript field 407A shown and/or described in FIG. 4A. In the example embodiment of FIG. 4B, the transcript field 407B displays the generated transcript. In some embodiments, the transcript field 407B may display at least a portion of the generated transcript before or after the user selects one or more screen capture thumbnails for viewing, such as via an enlarged view 405B described herein.

Screen capture preview pane 404B provides an enlarged view 405B of a thumbnail image 403C such that a user can better see the contents of the previewed screen capture. For example, a user may select a screen capture thumbnail for previewing, and the selected screen capture may appear in the screen capture preview pane 404B as an enlarged view 405B of the screen capture. The user may preview screen capture thumbnails, regardless of whether the thumbnail is currently selected for inclusion in the workflow information provided to the LLM. For example, the user may preview screen capture thumbnails that have an empty checkmark box and/or thumbnails that have a checked checkmark box. A thumbnail selected for previewing may be indicated by a bounding box. In the embodiment of FIG. 4B, the thumbnail image 403C selected for previewing is bounded by a darkened dashed line. The previewed thumbnail has also been selected for being provided to the LLM, as indicated by the checked checkmark box. As further described herein, the screen capture displayed in the screen capture preview pane 404B can be modified via a screen capture editing user interface such as screen capture editing user interface 500 (FIG. 5) that can receive user input for modification (e.g., annotating, blurring, and/or the like) of generated screen captures. In some embodiments, the screen capture preview pane 404B may provide an enlarged view 405B after the user selects one or more screen capture thumbnails for viewing. In some embodiments, the enlarged view 405B may display a portion of the screen capture thumbnail selected for viewing. In some embodiments, the enlarged view 405B may display the entirety of the screen capture thumbnail selected for viewing.

FIG. 5 illustrates an example screen capture editing user interface 500, wherein screen captures may be edited to add, remove, or update information included in the screen capture that will be sent to the LLM. The editing user interface 500 can receive user input, such as annotating (e.g., adding text) a screen capture, cropping at least a portion of the screen capture, and/or blurring of content displayed in the screen capture. The editing user interface 500 may provide editing tools for the user to use in modifying the previewed screen capture. In the embodiment of FIG. 5, a user has selected an annotation tool to add text 510 and a shape 520 to the screen capture. In some embodiments, while a user is using an editing tool, the portion of the screen capture being modified may be brightened/highlighted and portions of the screen capture not being modified may be darkened. A device or system may store the modified screen capture in memory for retrieval by AIS 102 to add to an LLM prompt.

Figure 6:
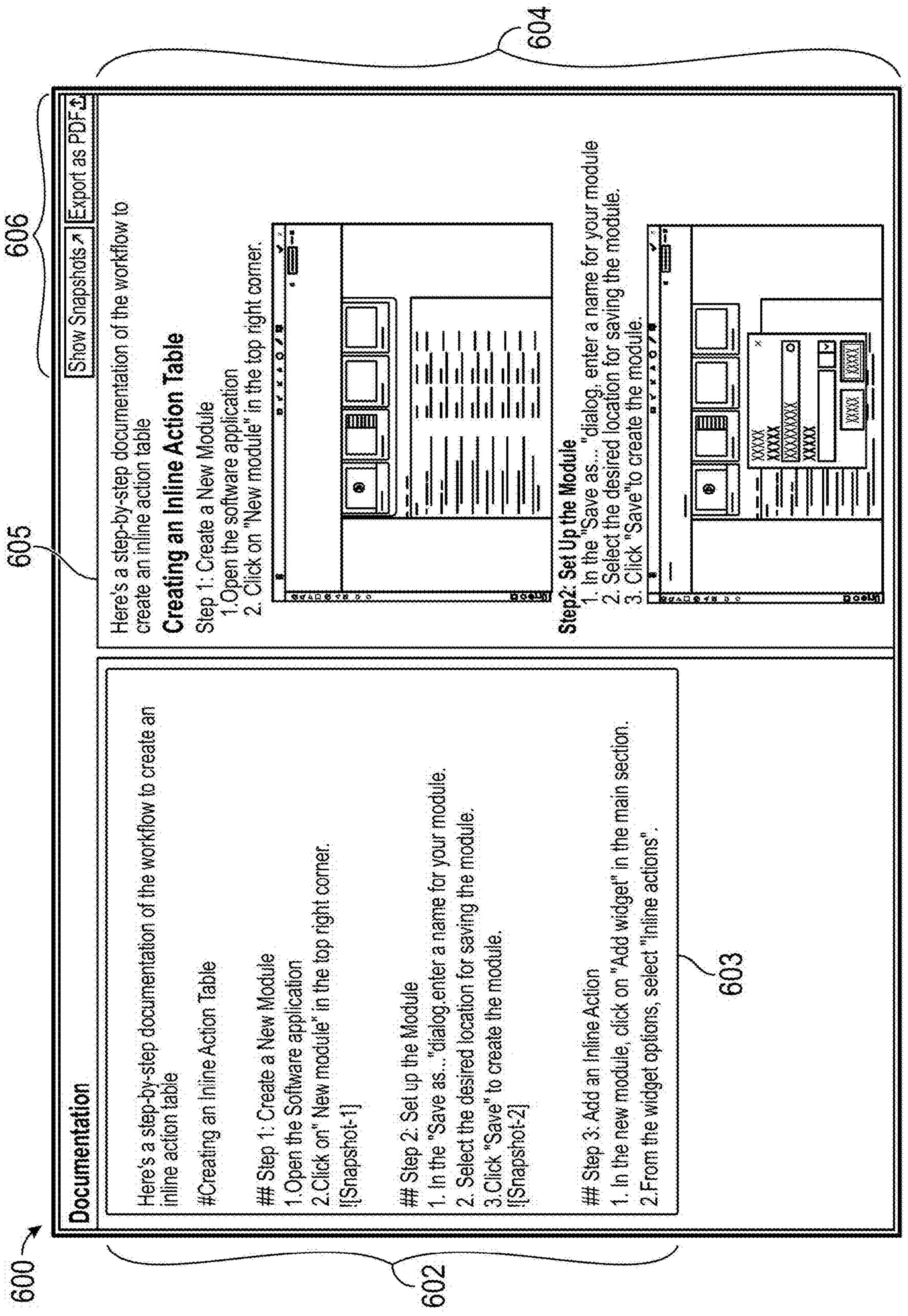

FIG. 6 illustrates an example documentation preview user interface 600 that may be displayed by the user device 150, for example, to allow the user to preview the workflow documentation generated by the AIS 102. In the example of FIG. 6, user interface 600 includes a markdown pane 602 and a visualization pane 604.

The markdown pane 602 can include a markdown field 603 that displays a markdown version of a workflow documentation generated by an LLM (e.g., LLM 130). The markdown field 603 can include markdown syntax configured to instruct the LLM to format information in the workflow documentation a certain way. The markdown syntax can include text phrases associated with the workflow information provided to the LLM, such as text phrases associated with one or more portions of a generated transcript, links (e.g., URLs) associated with one or more screen captures, and/or the like. In some embodiments, the markdown field 603 can receive user input. For example, a user can modify (e.g., add, remove, edit, change, and/or the like) any of markdown syntax via markdown field 603. Modifications to the markdown syntax via the markdown field 603 may be reflected in the workflow documentation seen in the visualization pane 604. For example, if a user modifies a portion of text or a screen capture link via the markdown field 603, a corresponding portion of the workflow documentation may change, such as by including the edited text and/or different screen captures. In the embodiment of FIG. 6, the markdown field 603 includes markdown syntax corresponding to workflow documentation for creating an inline action table.

The visualization pane 604 can display workflow documentation 605 generated by an LLM (e.g., LLM 130). The workflow documentation 605 may correspond with the markdown syntax provided in the markdown field 603, as described herein. The workflow documentation 605 can be the final workflow documentation that describes the entirety of the workflow of the user, such as the user's use of a software application (e.g., app 180) during the workflow capture session. The visualization pane 604 may provide a scrolling feature that permits a user to scroll to and view difference sections of the generated workflow documentation 605, such as sections that may not be currently displayed by the user interface. In the embodiment of FIG. 6, the generated workflow documentation 605 describes the user's use of a software application in creating an inline action table. In some embodiments, workflow documentation displayed in the visualization pane 604 may be intermediate workflow documentation that describes a portion of the steps performed by the user in using the software application during the capture session.

The user interface 600 may include graphical elements 606 that provide certain functionalities when selected by a user. In the embodiment of FIG. 6, graphical elements 606 include a "Show snapshots" functionality and an "Export as PDF" functionality. Selecting one of the graphical elements 606 may cause the user device 150 and/or AIS 102 to perform one or more operations. For example, selecting "Show snapshots" may cause the device 150 and/or AIS 102 to provide a user interface that displays the selected screen captures that have been included in the workflow documentation generated by the LLM. In some embodiments, selecting "Show snapshots" may cause the device 150 and/or AIS 102 to provide a user interface that displays all screen captures generated by the screen capture generation module 164 during the capture session. Selecting "Show snapshots" may cause the device 150 and/or AIS 102 to return to an earlier provided user interface, such as user interfaces 400A-400B shown and/or described herein with respect to FIGS. 4A-4B.

In some embodiments, selecting "Export as PDF" may cause the device 150 and/or the AIS 102 to generate a PDF document of the workflow documentation. Although the embodiment of FIG. 6 describes exporting the documentation document as a PDF file, this is not intended to be limiting. The system can support any available type of export format.

Example Method

Figure 7:
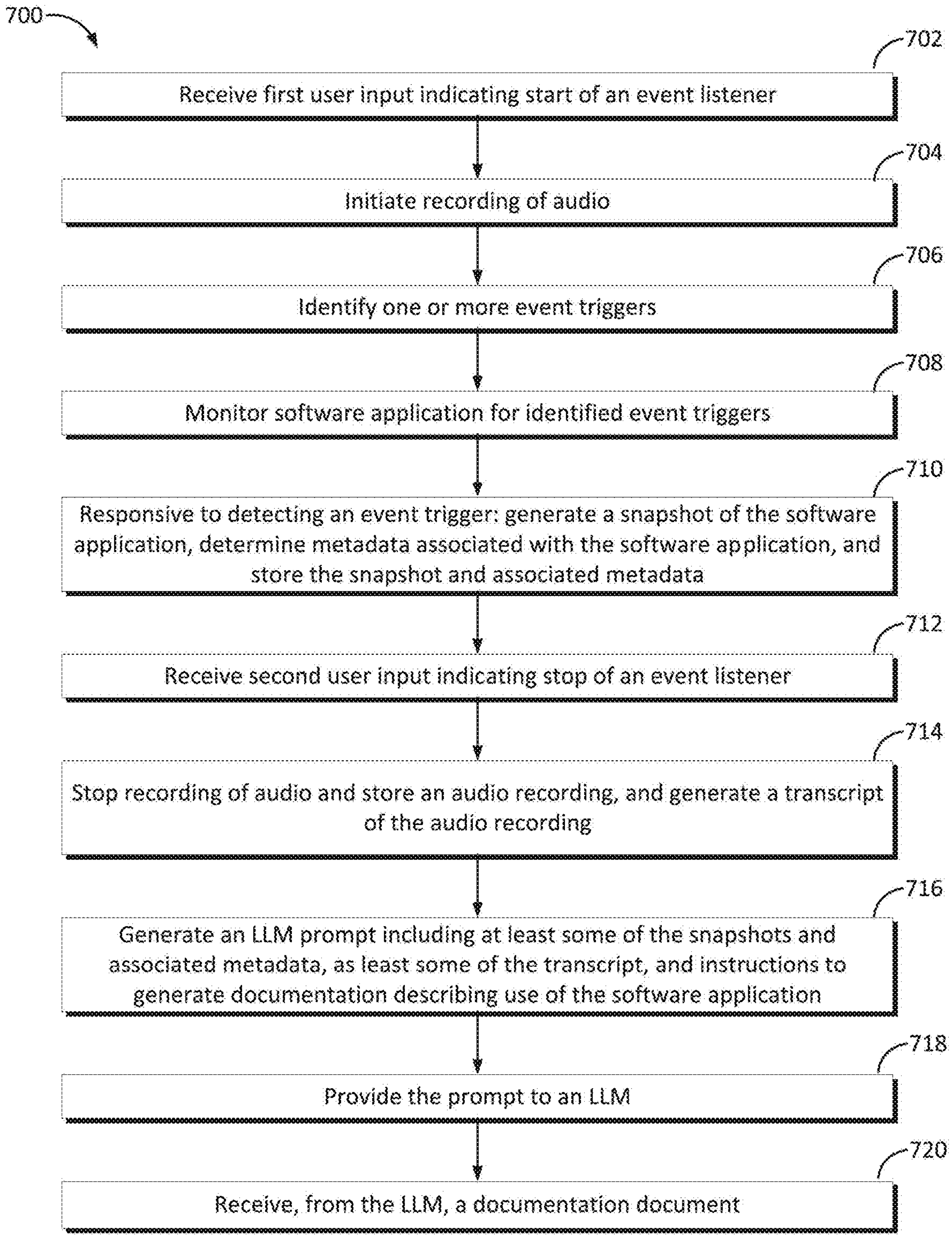
FIG. 7 is a flowchart illustrating an example process for generating a documentation document.

FIG. 7 is a flowchart illustrating an example process 700 for generating workflow documentation that describes a user's use of a software application, such as in performing a particular workflow. The process 700, or portions thereof, can be implemented by a computing device such as a hardware processor. The process 700, or portions thereof, can be executed by one or more hardware processors, whether they are associated with a singular or multiple computing devices like user device 150, AIS 102, data processing services 120, LLM 130, and/or devices in remote or wireless communication. The implementation may vary. For example, it could be controlled by processors related to an AIS, such as AIS 102, or can involve modifications like omitting blocks, adding blocks, and/or rearranging the order of execution of the blocks. The process 700 serves as an example and is not intended to restrict the present disclosure. In some embodiments, the process 700, or portions thereof, can be performed by a computing device associated with AIS 102, such as the documentation generation module 160 and/or one or more components thereof as described herein.

Beginning at block 702, an AIS (e.g., AIS 102) receives user input, such as a first user input, indicative of a user beginning a capture session. For example, the user input may be indicative of starting an event listener configured to monitor a software application, e.g., for particular interactions of the user with the software application and/or actions performed by the software application. The AIS can receive the user input via a user interface of a user device 150 and/or the AIS 102, such as a user interface provided by user interface module 104. The AIS may receive the user input via user interface 300A shown and/or described herein.

In some embodiments, at block 702, responsive to user input indicative of beginning a capture session, the AIS may generate an alert or notification for output to the user. The alert and/or notification may be indicative of initiation of a capture session and/or indicative that a capture session is on-going. The alert can include visual, auditory, and/or haptic alerts. For example, the alert can include visual, auditory, and/or haptic feedback. In some embodiments, at block 702, the AIS may cause visual indicia indicative of an initiation of a capture session and/or indicative of an ongoing capture session to be displayed in a GUI provided by the AIS (e.g., AIS 102) and/or a user device (e.g., user device 150). In some embodiments, the AIS may cause a speaker connected to (e.g., in communication with) the AIS and/or the user device to output a sound indicative of beginning a capture session. In some embodiments, at block 702, the AIS may cause the user device (or a component thereof) to vibrate, indicative of beginning a capture session. In some embodiments, the AIS may cause continuous or persistent display of visual alerts or notifications indicative of an ongoing capture session for visualization by the user, such as for the entire duration of a capture session (e.g., until the system receives user input indicative of ending the capture session, such as at block 712).

At block 704, responsive to the first user input, the AIS may initiate recording of audio from an audio input device. The audio may be indicative of words spoken by a user as the user uses a software application (e.g., app 180). The audio may be indicative of description of the steps performed by the user in using app 180. In some embodiments, at block 704, the audio input device may be any available type of audio input device, such as a built-in microphone, an external microphone (e.g., a headset), and/or the like. In some embodiments, at block 704, the audio input device may include or be used in combination with a web speech API configured to implement speech recognition software based on the audio signals received by the audio input device.

At block 706, the AIS may identify one or more event triggers. For example, a default set of triggers may be selected. In some implementations, the set of triggers may be automatically selected (e.g., by the AIS) based on the type of software application that will be monitored, user preferences, system configuration, and/or any other relevant characteristics. In some embodiments, the user selects event triggers, such as from a list of available event triggers. In some embodiments, event triggers can include native events, e.g., native browser events, and/or custom events, such as a user-defined events.

At block 708, the AIS may monitor a software application (e.g., app 180) as a user uses the software application. In particular, the AIS monitors the software application 180 (e.g., the browser in which the app 180 is executing and/or the actual app 180) for any of the identified event triggers (e.g., default or user-selected triggers). The AIS may be in communication with the software application such that the AIS can access data originating from the software application. In some embodiments, at block 708, the AIS may passively monitor software application 180 for identified triggers. In some embodiments, at block 708, the AIS may actively monitor software application 180 for identified triggers. In some embodiments, at block 708, the AIS may integrate with the software application's internal event-driven architecture, such as via an API. In some embodiments, at block 708, the AIS may continuously or periodically check (e.g., query), such as in an open loop during the capture session, for changes in application data indicative of identified triggers.

At block 710, responsive to detecting an identified event trigger, the AIS may gather workflow information associated with the event trigger. For example, the AIS may execute a function that captures an image of the display content displayed in the software application user interface (e.g., within a browser). At block 710, the screen capture may be of the display content displayed by the user interface visualized by the user in using software application 180. The screen capture may be of the display content seen by the user at or near the time that the AIS detected the identified trigger. The screen capture may be of the display content seen by the user at or near the time that the user caused the trigger to occur. The AIS may store the screen capture in memory.

In some embodiments, at block 710, responsive to detecting an identified event trigger, the AIS may determine metadata associated with the software application. In some embodiments, at block 712, the metadata may be associated with the generated screen capture. The AIS may access metadata originating from software application 180 via an API call. Metadata may include any of the metadata described herein (e.g., timestamps). At block 712, the AIS may associate the metadata with the corresponding generated screen capture. The AIS may store the metadata in memory.

The AIS may perform any of blocks 708-710, or any portions thereof, any number of times as the AIS monitors the software application during a workflow capture session.

At block 712, the AIS receives user input, such as a second user input, indicative of the user ending the capture session. For example, the user input may be indicative of ending an event listener. The user input may be indicative of the event listener ending monitoring of interactions of the user with the software application and/or actions performed by the software application, such as software application 180. The AIS can receive the user input via a user interface of a user device 150 and/or the AIS 102, such as a user interface provided by user interface module 104. The AIS may receive the user input via user interface 300 shown and/or described herein.

In some embodiments, at block 712, responsive to user input indicative of ending a capture session, the AIS may generate an alert or notification for output to the user. The alert and/or notification may be indicative of ending the capture session. The alert can include visual, auditory, and/or haptic alerts. For example, the alert can include visual, auditory, and/or haptic feedback. In some embodiments, at block 712, the AIS may cause visual indicia indicative of ending a capture session to be displayed in a GUI provided by the AIS (e.g., AIS 102) and/or a user device (e.g., user device 150). In some embodiments, the AIS may cause a speaker connected to (e.g., in communication with) the AIS and/or the user device to output a sound indicative of ending a capture session. In some embodiments, at block 712, the AIS may cause the user device (or a component thereof) to vibrate, indicative of ending a capture session.

At block 712, in some embodiments, the AIS may cease causing display of any continuous or persistent visual alerts or notifications indicative of an ongoing capture session. For example, responsive to use input received at block 712, the AIS can stop causing display of any alerts and/or notifications that were generated in response to user input received at block 702.

At block 714, the AIS may stop recording audio and store the recorded audio in memory. In some embodiments, at block 714, the AIS may generate a transcript of the stored audio recording. The AIS may generate the transcript based on received audio signals indicative of words spoken by the user. The received audio signals may be indicative of the user describing use of software application 180. In some embodiments, at block 714, the AIS can transcribe the audio recording via a speech API such as a web speech API. In some embodiments, at block 714, the AIS can transcribe the audio recording in algorithm via integrated software. For example, the AIS may leverage any available type of automatic speech recognition algorithm for transcribing the stored audio. The generated transcript may provide text content that describes the user's use of software application 180 in performing the particular workflow. In some embodiments, at block 714, the AIS may associate metadata with the generated transcript, such as with one or more portions of the generated transcript. For example, each portion of the generated transcript may be timestamped based on when the corresponding audio signals were received at the audio input device.

At block 716, the AIS may generate a prompt based on at least some of the generated screen captures, determined metadata, generated transcript, and instructions. The instructions may be intended to instruct an LLM to generate workflow documentation that describes the user's use of software application 180 based on the included screen captures and associated transcripts and metadata.

In some embodiments, prior to generating the LLM prompt at block 716, the AIS may receive user input indicative of the user modifying, selecting and/or deselecting workflow information for inclusion in the LLM prompt. For example, The AIS can receive the user input via a user interface of a user device 150 and/or the AIS 102, such as a user interface provided by user interface module 104. The AIS may receive the user input via user interfaces 400A-400B shown and/or described herein. For example, at block 716, the user may interact with screen capture pane 402A, 402B shown and/or described in FIGS. 4A-4B, and select and/or deselect one or more screen capture thumbnails. Based on the user selection, the AIS may be configured to generate the prompt including selected screen captures and not including deselected/unselected screen captures.

The user customization of workflow information may further include user input indicative of the user modifying generated screen captures or transcripts. For example, the user may annotate and/or blur portions of a generated screen capture, such as via screen capture editing user interface 500 shown and/or described in FIG. 5. The screen capture editing user interface 500 may provide the user with one or more editing tools that allows the user to modify a generated screen capture. In some embodiments, the user may use an annotation tool to annotate, via screen capture editing user interface 500, a generated screen capture. In some embodiments, the user may use a cropping tool to crop, via screen capture editing user interface 500, at least a portion of the generated screen capture. In some embodiments, the user may use a blurring tool to blur, via screen capture editing user interface 500, at least a portion of the generated screen capture. Additionally, the user may edit portions of the transcript, such as by adding, removing, and/or changing text of the transcript. The user may edit one or more portions of a generated transcript, such as via transcript field 407A, 407B shown and/or described in FIGS. 4A-4B. As described herein, the transcript fields 407A, 407B may be provided by the user interfaces 400A, 400B.

At block 716, in some embodiments, the AIS may be configured to determine, for each screen capture to be included in the LLM prompt, text in the generated transcript that corresponds to the screen capture. Text that corresponds with a screen capture can include text that describes the display content of the screen capture. For example, the AIS may associate text in the transcript (e.g., a portion of the transcript) with the generated screen capture based on determined metadata, such as timestamps. Each generated screen capture may include a timestamp, such as a timestamp that corresponds to the time at which the AIS generated the screen capture. In some embodiments, the screen capture timestamps may correspond to a time at or near a time at which the AIS detected an associated event trigger (or at which the trigger occurred). Each portion of the generated transcript may include a timestamp, such as a timestamp that corresponds to the time at which the audio was received by the audio input device. In some embodiments, the transcript timestamps may correspond to a time at or near a time at which the AIS detected the associated event trigger (or at which the trigger occurred). In some embodiments, each generated screen capture may include a timestamp that corresponds with that of at least a portion of the transcript. In some implementations, the AIS may employ natural language processing (NLP) to better identify the transcript portion associated with each screen capture. For example, NLP may identify when the discussion (in the transcript) changes from one task to another. In some examples, the AIS may leverage an LLM (e.g., LLM 130) to correlate portions of the transcript with each screen capture. The AIS may call the LLM and pass the generated transcript and screen captures into the LLM for processing. The LLM may provide a response to the AIS indicating which portions of the transcript are associated with which screen captures. At block 716, the AIS may associate at least a portion of the transcript with each of the generated screen captures based on the corresponding timestamps and/or other information (e.g., NPL) that associates portions of the transcript with the screen captures.

At block 718, the AIS may provide the generated prompt to an LLM (e.g., LLM 130). The prompt can include at least some of the screen captures and associated metadata, at least some of the generated transcript, and instructions (e.g., an initial prompt) to generate documentation describing the workflow of the user, such as use of the software application. The prompt may induce the LLM to generate workflow documentation that describes the user's use of software application 180 in performing the workflow.

At block 720, the AIS may receive an LLM output, such as a documentation document. The documentation document may describe the user's use of software application 180, such as in performing the particular workflow. The documentation document may provide a step-by-step description of how the user used software application 180 in the capture session. In some embodiments, the documentation document may include one or more of the screen captures that were included in the generated prompt. In some embodiments, the documentation document may include one or more portions of the generated transcript that was included in the generated prompt.

The AIS may instruct the LLM to format the documentation document such that the workflow information is organized in discrete sections. Each section may describe a step performed by the user in using software application 180 and may include screen captures and/or transcript associated with the respective step. In some embodiments, workflow information may be organized into discrete sections such as may be determined by NLP analysis of the transcript and/or detected events. In some embodiments, workflow information may be organized into discrete sections such as may be determined by analysis of metadata associated with screen captures and/or analysis of image data (e.g., image recognition, UI element detection, and/or the like).

In some embodiments, at block 720, the documentation document may be an intermediate documentation document, such as described herein. For example, the intermediate documentation document may describe one or more steps performed by the user in using software application 180 to perform the workflow. The intermediate documentation document may describe fewer than all steps performed by the user in using the software application 180. In some embodiments, the AIS may store the intermediate documentation document to potentially include in another LLM prompt intended for the LLM.

In some embodiments, at block 720, the documentation document may be a final documentation document, such as described herein. The final documentation document may describe the entirety of the user's use of software application 180 in performing the particular workflow. For example, the final documentation document may describe all steps performed by the user in using software application 180 in the capture session.

Additional Example Implementations and Details

In an implementation, the systems or devices described herein (e.g., one or more aspects of the AIS 102, data processing services 120, user device 150, LLM 130 and/or the like) may comprise, or be implemented in, a "virtual computing environment". As used herein, the term "virtual computing environment" should be construed broadly to include, for example, computer-readable program instructions executed by one or more processors to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
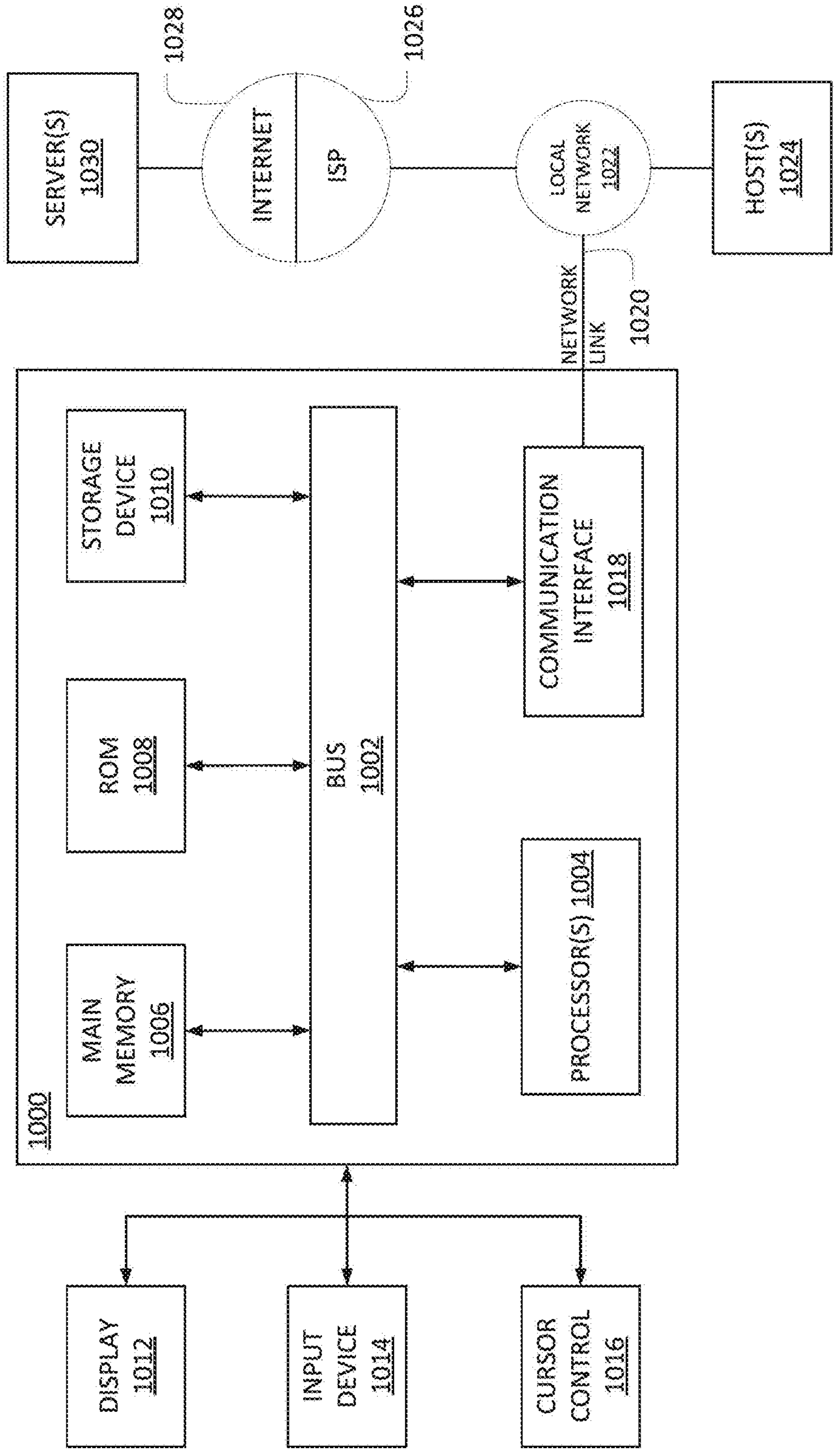
FIG. 8 is a block diagram of an example computer system consistent with various implementations of the present disclosure.

For example, FIG. 8 shows a block diagram that illustrates a computer system 1000 upon which various implementations and/or aspects (e.g., one or more aspects of the AIS 102, one or more aspects of the data processing services 120, one or more aspects of the user device(s) 150, one or more aspects of the LLM 130, and/or the like) may be implemented. Multiple such computer systems 1000 may be used in various implementations of the present disclosure. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random-access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. The main memory 1006 may, for example, include instructions to implement server instances, queuing modules, memory queues, storage queues, user interfaces, and/or other aspects of functionality of the present disclosure, according to various implementations.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), and/or the like, is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware, and/or program logic which in combination with the computer system causes or programs computer system 1000 to be a special-purpose machine. According to one implementation, the techniques herein are performed by computer system 1000 in response to processor(s) 1004 executing one or more sequences of one or more computer-readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicate with a WAN). Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds at which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Aspects

Examples of implementations of the present disclosure can be described in view of the following example aspects. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example aspects below, or any features of the example aspects, can be combined with any one or more other example aspects, or features of the example aspects or other features of the present disclosure.

Aspect 1. A computer-implemented method performed by a computing system having one or more hardware computer processors in communication with one or more non-transitory computer readable storage devices storing software instructions executable by the hardware computer processors to manage interactions with an artificial intelligence (AI) model, the method comprising: in response to a first user input indicating start of an event listener: initiating recording of audio from an audio input device of the computing system; identifying one or more event triggers associated with user interactions with a software application displayed on the computing system; and initiating monitoring of the software application for the identified one or more event triggers; in response to detecting an event trigger: generating a screen capture of the software application; determining metadata associated with the software application; and storing the screen capture and the determined metadata; and in response to a second user input indicating stop of the event listener: stopping the recording of the audio; storing an audio recording of the recorded audio; stopping the monitoring of the software application; generating a transcript of the recorded audio; generating input for an AI model, the AI model input including at least some of the screen captures with associated metadata, at least some of the transcript, and instructions to generate documentation describing use of the software application; providing the AI model input to an AI model; and receiving, from the AI model, a documentation document.

Aspect 2. The computer-implemented method of Aspect 1, wherein the AI model input comprises a large language model (LLM) prompt.

Aspect 3. The computer-implemented method of Aspect 1, wherein the AI model includes an LLM.

Aspect 4. The computer-implemented method of Aspect 1, the method further comprising: providing a user interface configured to receive user input selecting or deselecting screen captures, wherein the at least some of the screen captures includes only screen captures selected by the user.

Aspect 5. The computer-implemented method of Aspect 4, wherein the user interface further allows the user to annotate screen captures.

Aspect 6. The computer-implemented method of Aspect 4, the method further comprising: determining, for individual screen captures: text in the transcript associated with the individual screen capture, based at least on time stamps associated with the transcript and the screen captures; wherein the user interface is configured to selectively display screen captures along with text from the transcript determined to be associated with the screen capture.

Aspect 7. The computer-implemented method of Aspect 1, wherein the event triggers include one or more of: keypresses, keypad presses, taps, clicks, hovers, scrolling, or movement of a cursor.

Aspect 8. The computer-implemented method of Aspect 1, wherein the metadata includes one or more of: an event type, a timestamp, text content of a target element, position of the target element, target key, event source, event position, scroll position, event duration, or event count.

Aspect 9. The computer-implemented method of Aspect 1, wherein the software application comprises a cloud-based application in communication with a browser executing on the computing system.

Aspect 10. The computer-implemented method of Aspect 1, wherein the event triggers include native events, the native events natively identified by the software application or by a browser running the software application.

Aspect. 11. The computer-implemented method of Aspect 1, wherein the event triggers include custom events, the custom events define by a developer of the software application or by a provider of a computing system configured to monitor use of the software application, the custom events including events other than native events.

Aspect 12. The computer-implemented method of Aspect 11, wherein the custom events include only non-native events.

Aspect 13. The computer-implemented method of Aspect 1, the method further comprising: for individual screen captures: determining a portion of the screen capture to blur; and blurring the determined portion of the screen capture.

Aspect 14. The computer-implemented method of Aspect 1, the method further comprising: for individual screen captures: determining a portion of the screen capture to crop; and cropping the determined portion of the screen capture.

Aspect 15. The computer-implemented method of Aspect 1, the method further comprising: segmenting the screen captures into distinct sections based at least in part on a token limit of the AI model, wherein each section comprises one or more screen captures associated with at least a portion of the transcript; generating the AI model input based on at least one section of the screen captures and associated metadata, one or more corresponding portions of the transcript, and instructions to generate documentation describing a portion of the use of the software application; providing the AI model input to the AI model; and receiving, from the AI model, an intermediate documentation document.

Aspect 16. A computer-implemented method performed by a computing system having one or more hardware computer processors in communication with one or more non-transitory computer readable storage devices storing software instructions executable by the hardware computer processors to manage interactions with an artificial intelligence (AI) model, the method comprising: detecting one or more browser events; generating one or more screen captures of a graphical user interface based on detecting the browser events, and storing the one or more screen captures in a first memory location; determining metadata associated with the detected browser events and storing the metadata in a second memory location; generating a transcript based on recorded audio and storing the transcript in a third memory location; generating input for an AI model, the AI model input including at least some of the screen captures with associated metadata, at least some of the transcript, and instructions to generate documentation describing a workflow of a user; providing the AI model input to an AI model; and receiving, from the AI model, a documentation document.

Aspect 17. The computer-implemented method of Aspect 16, wherein the AI model input comprises a large language model (LLM) prompt.

Aspect 18. The computer-implemented method of Aspect 16, wherein the AI model includes an LLM.

Aspect 19. The computer-implemented method of Aspect 16, the method further comprising initiating, based on received user input, detection of the one or more browser events.

Aspect 20. The computer-implemented method of Aspect 16, the method further comprising selecting or deselecting, based on received user input, one or more screen captures to include in the AI model input.

Aspect 21. The computer-implemented method of Aspect 20, the method further comprising: dividing one or more of the selected screen captures into distinct sections based at least in part on a token limit of the AI model; wherein each section comprises one or more of the selected screen captures and corresponds with at least a portion of the generated transcript.

Aspect 22. The computer-implemented method of Aspect 21, the method further comprising: generating input for an AI model, the AI model input including at least one section of screen captures with associated metadata, at least some of the transcript, and instructions to generate documentation describing a portion of the workflow of the user; providing the AI model input to the AI model; and receiving, from the AI model, an intermediate documentation document that describes a portion of the workflow of the user.

Aspect 23. The computer-implemented method of Aspect 22, the method further comprising: generating input for an AI model, the AI model input including at least one or more intermediate documentation documents, at least some of the transcript, and instructions to generate documentation describing all of the workflow of the user; providing the AI model input to the AI model; and receiving, from the AI model, a final documentation document that describes all of the workflow of the user.

Aspect 24. The computer-implemented method of Aspect 16, the method further comprising: editing, based on received user input, one or more of the screen captures, wherein editing screen captures comprises adding text to the one or more screen captures, cropping at least a portion of the one or more screen captures, or blurring at least a portion of the one or more screen captures.

Aspect 25. The computer-implemented method of Aspect 16, the method further comprising editing, based on received user input, at least a portion of the generated transcript.

Aspect 26. The computer-implemented method of Aspect 16, wherein the browser events comprise one or more of native events or custom events.

Aspect 27. The computer-implemented method of Aspect 16, wherein generating screen captures comprises automatically cropping at least a portion of one or more screen captures.

Aspect 28. The computer-implemented method of Aspect 16, wherein generating screen captures comprises automatically blurring at least a portion of one or more screen captures.

Aspect 29. The computer-implemented method of Aspect 16, wherein determining metadata associated with the detected browser events comprises determining metadata associated with a software application or metadata associated with a generated screen capture.

Aspect 30. The computer-implemented method of Aspect 16, wherein the recorded audio is based on received audio signals indicative of words spoken by the user that describe a workflow of the user.

Aspect 31. The computer-implemented method of Aspect 16, wherein the generated transcript is configured to provide context to an AI model, each portion of the generated transcript associated with one or more screen captures.

Aspect 32. The computer-implemented method of Aspect 16, wherein selected screen captures are devoid of sensitive information.

Aspect 33. A system comprising: one or more computer-readable storage mediums or devices comprising, configured to store, and/or storing program instructions; and one or more processors configured to execute the program instructions to cause the system to perform the computer-implemented method of any of aspects 1-32.

Aspect 34. One or more computer-readable storage mediums or devices comprising, configured to store, and/or storing program instructions, the program instructions executable by one or more processors to cause the one or more processors to perform the computer-implemented method of any of aspects 1-32.

What is claimed is:

1. A computer-implemented method performed by a computing system having one or more hardware computer processors in communication with one or more non-transitory computer readable storage devices storing software instructions executable by the one or more hardware computer processors to manage interactions with an artificial intelligence (AI) model, the computer-implemented method comprising:

- in response to a first user input indicating start of an event listener:
  - initiating recording of audio from an audio input device of the computing system;
  - identifying one or more event triggers associated with user interactions with a software application displayed on the computing system; and
  - initiating monitoring of the software application for the identified one or more event triggers;
- detecting an event trigger of the identified one or more event triggers;
- in response to detecting the event trigger:
  - generating one or more screen captures of the software application;
  - determining metadata associated with the software application; and
  - storing the one or more screen captures and the determined metadata; and
- in response to a second user input indicating stop of the event listener:
  - stopping the recording of the audio;
  - storing an audio recording of the recorded audio;
  - stopping the monitoring of the software application;
  - generating a transcript of the recorded audio;
  - generating input for an AI model, the AI model input including at least some of the one or more screen captures with associated metadata, at least some of the transcript, and instructions to generate documentation describing use of the software application;
  - providing the AI model input to the AI model; and
  - receiving, from the AI model, the documentation.

2. The computer-implemented method of claim 1, wherein the AI model input comprises a large language model (LLM) prompt.

3. The computer-implemented method of claim 1, wherein the AI model includes a large language model (LLM).

4. The computer-implemented method of claim 1, further comprising:

- providing a user interface configured to receive user input selecting or deselecting screen captures, wherein at least some of the one or more screen captures includes only screen captures selected by a user.

5. The computer-implemented method of claim 4, wherein the user interface further allows the user to annotate screen captures.

6. The computer-implemented method of claim 4, the method further comprising:

- determining, for individual screen captures:
  - text in the transcript associated with respective screen captures of the one or more screen captures based at least on (i) time stamps associated with the transcript and (ii) timestamps associated with the one or more screen captures;
- wherein the user interface is configured to selectively display screen captures along with text from the transcript determined to be associated with the respective screen captures.

7. The computer-implemented method of claim 1, wherein the one or more event triggers include one or more of: keypresses, keypad presses, taps, clicks, hovers, scrolling, or movement of a cursor.

8. The computer-implemented method of claim 1, wherein the metadata includes one or more of: an event type, a timestamp, text content of a target element, position of the target element, target key, event source, event position, scroll position, event duration, or event count.

9. The computer-implemented method of claim 1, wherein the software application comprises a cloud-based application in communication with a browser executing on the computing system.

10. The computer-implemented method of claim 1, wherein the one or more event triggers include native events, the native events being natively identified by the software application or by a browser running the software application.

11. The computer-implemented method of claim 1, wherein the one or more event triggers include custom events, the custom events defined by a developer of the software application or by a provider of a computing system configured to monitor use of the software application, the custom events including events other than native events.

12. The computer-implemented method of claim 11, wherein the custom events include only non-native events.

13. The computer-implemented method of claim 1, further comprising:

for individual screen captures of the one or more screen captures:

determining a portion of a screen capture to blur; and blurring the determined portion of the screen capture.

14. The computer-implemented method of claim 1, further comprising:

for individual screen captures of the one or more screen captures:

determining a portion of a screen capture to crop; and cropping the determined portion of the screen capture.

15. The computer-implemented method of claim 1, further comprising:

segmenting the one or more screen captures into distinct sections based at least in part on a token limit of the AI model, wherein each section comprises one or more screen captures associated with at least a portion of the transcript;

generating a second AI model input based on at least one section of the one or more screen captures and associated metadata, one or more corresponding portions of the transcript, and instructions to generate second documentation describing a portion of the use of the software application;

providing the second AI model input to the AI model; and receiving, from the AI model, the second documentation.

16. A system comprising:

one or more computer-readable storage mediums storing program instructions; and one or more hardware processors configured to execute the program instructions to cause the system to perform a computer-implemented method comprising:

in response to a first user input indicating start of an event listener:

initiating recording of audio from an audio input device;

identifying one or more event triggers associated with user interactions with a software application; and initiating monitoring of the software application for the identified one or more event triggers;

detecting an event trigger of the identified one or more event triggers;

in response to detecting the event trigger:

generating one or more screen captures of the software application;

determining metadata associated with the software application; and storing the one or more screen captures and the determined metadata; and in response to a second user input indicating stop of the event listener:

stopping the recording of the audio;

storing an audio recording of the recorded audio;

stopping the monitoring of the software application;

generating a transcript of the recorded audio;

generating input for an AI model, the AI model input including at least some of the one or more screen captures with associated metadata, at least some of the transcript, and instructions to generate documentation describing use of the software application;

providing the AI model input to an AI model; and receiving, from the AI model, the documentation.

17. One or more non-transitory computer-readable storage mediums storing program instructions, the program instructions executable by one or more hardware processors to cause the one or more hardware processors to perform a computer-implemented method comprising:

in response to a first user input indicating start of an event listener:

initiating recording of audio from an audio input device;

identifying one or more event triggers associated with user interactions with a software application; and initiating monitoring of the software application for the identified one or more event triggers;

detecting an event trigger of the identified one or more event triggers;

in response to detecting the event trigger:

generating one or more screen captures of the software application;

determining metadata associated with the software application; and storing the one or more screen captures and the determined metadata; and in response to a second user input indicating stop of the event listener:

stopping the recording of the audio;

storing an audio recording of the recorded audio;

stopping the monitoring of the software application;

generating a transcript of the recorded audio;

generating input for an AI model, the AI model input including at least some of the one or more screen captures with associated metadata, at least some of the transcript, and instructions to generate documentation describing use of the software application;

providing the AI model input to the AI model; and receiving, from the AI model, the documentation.

* * * * *